United States Patent [19]
Hoenig et al.

[11] Patent Number: 6,156,842
[45] Date of Patent: Dec. 5, 2000

[54] STRUCTURES AND FABRICATED ARTICLES HAVING SHAPE MEMORY MADE FROM α-OLEFIN/VINYL OR VINYLIDENE AROMATIC AND/OR HINDERED ALIPHATIC VINYL OR VINYLIDENE INTERPOLYMERS

[75] Inventors: Stephen M. Hoenig, Lake Jackson, Tex.; Robert R. Turley, Webbers Falls, Okla.; Yunwa W. Cheung, Lake Jackson, Tex.; Martin J. Guest, Lake Jackson, Tex.; Charles F. Diehl, Lake Jackson, Tex.; Kenneth B. Stewart, Lake Jackson, Tex.; John Sneddon, Santa Monica, Calif.

[73] Assignee: The Dow Chemical Company, Midland, Mich.

[21] Appl. No.: 09/265,794

[22] Filed: Mar. 10, 1999

Related U.S. Application Data

[60] Provisional application No. 60/077,633, Mar. 11, 1998.

[51] Int. Cl.[7] ............................ C08L 23/08; C08L 25/06; D01F 8/06
[52] U.S. Cl. .................. 525/171; 525/214; 525/217; 525/220; 525/221; 525/222; 525/232; 525/233; 525/235; 525/240; 525/241; 428/373
[58] Field of Search ................................ 525/191, 214, 525/217, 220, 221, 222, 232, 233, 235, 240, 241; 428/373

[56] References Cited

U.S. PATENT DOCUMENTS

| | | | |
|---|---|---|---|
| 2,957,512 | 10/1960 | Wade et al. | 526/348.1 |
| 4,076,698 | 2/1978 | Anderson et al. | 526/348.6 |
| 4,413,110 | 11/1983 | Kavesh et al. | 523/169 |
| 4,584,347 | 4/1986 | Harpell et al. | 525/119 |
| 4,668,556 | 5/1987 | Hermann et al. | 428/122 |
| 4,801,482 | 1/1989 | Goggans | 428/152 |
| 4,939,016 | 7/1990 | Radwanski et al. | 428/152 |
| 5,049,591 | 9/1991 | Hayashi et al. | 521/159 |
| 5,055,438 | 10/1991 | Canich | 502/117 |
| 5,057,475 | 10/1991 | Canich et al. | 502/104 |
| 5,066,091 | 11/1991 | Stoy et al. | 385/98 |
| 5,093,384 | 3/1992 | Hayashi et al. | 521/159 |
| 5,096,867 | 3/1992 | Canich | 502/103 |
| 5,098,776 | 3/1992 | Kobayashi et al. | 428/283 |
| 5,189,110 | 2/1993 | Ikamatu et al. | 525/314 |
| 5,192,301 | 3/1993 | Kamiya et al. | 606/212 |
| 5,445,140 | 8/1995 | Tovey | 600/117 |
| 5,552,197 | 9/1996 | Bettinger | 428/34.9 |
| 5,634,913 | 6/1997 | Stinger | 604/272 |
| 5,703,187 | 12/1997 | Timmers | 526/282 |
| 5,721,185 | 2/1998 | LaPointe et al. | 502/117 |

FOREIGN PATENT DOCUMENTS

| | | |
|---|---|---|
| 0 416 815 A2 | 8/1990 | European Pat. Off. . |
| 0764664 A2 | 8/1990 | European Pat. Off. . |
| 96/07681 | 3/1996 | WIPO . |
| 97/18248 | 5/1997 | WIPO . |
| 97/33921 | 9/1997 | WIPO . |
| 98/09999 | 3/1998 | WIPO . |
| 98/10015 | 3/1998 | WIPO . |
| 98/10017 | 3/1998 | WIPO . |
| 98/10160 | 3/1998 | WIPO . |

*Primary Examiner*—Nathan M. Nutter

[57] ABSTRACT

The present invention pertains to structures and fabricated articles having shape/reshape behavior (and processes for their preparation) comprising;

(A) from about 1 to 100 wt % (based on the combined weights of Components A and B) of at least one substantially random interpolymer having an $I_2$ of 0.1 to about 1,000 g/10 min and an $M_w/M_n$ of from about 1.5 to about 20, which comprises;

(1) from about 38 to about 65 mol % of polymer units derived from;
  (a) at least one vinyl or vinylidene aromatic monomer, or
  (b) at least one hindered aliphatic or cycloaliphatic vinyl or vinylidene monomer, or
  (c) a combination of at least one aromatic vinyl or vinylidene monomer and at least one hindered aliphatic or cycloaliphatic vinyl or vinylidene monomer, and (2) from about 35 to about 62 mol % of polymer units derived from ethylene and/or at least one $C_{3-20}$ α-olefin; and (B) from 0 to about 99 wt % (based on the combined weights of Components A and B) of at least one polymer other than that of Component A; and (C) from 0 to about 50 % by weight (based on the combined weights of components A, B, C and D) of at least one tackifier; and (D) from 0 to about 80% by weight (based on the combined weights of components A, B, C and D) of at least one filler.

26 Claims, No Drawings

STRUCTURES AND FABRICATED ARTICLES HAVING SHAPE MEMORY MADE FROM α-OLEFIN/VINYL OR VINYLIDENE AROMATIC AND/OR HINDERED ALIPHATIC VINYL OR VINYLIDENE INTERPOLYMERS

CROSS-REFERENCE TO RELATED APPLICATIONS

This application claims the benefit of US provisional application number 60/077,633 filed on Mar. 11, 1998.

FIELD OF THE INVENTION

This invention is related to structures and fabricated articles prepared from polymers which comprise at least one substantially random interpolymer comprising polymer units derived from one or more α-olefin monomers with one or more vinyl or vinylidene aromatic monomers and/or hindered aliphatic or cycloaliphatic vinyl or vinylidene monomers, or blend compositions therefrom. Structures and articles prepared from such interpolymers can exhibit shape memory properties, in that they initially demonstrate high modulus, stiffness and tensile strength, (i.e. engineering resin type properties), but with the introduction of an energy source such as heat, in an amount sufficient to increase the temperature of the structure or article above the interpolymer's glass transition temperature (Tg), they quickly and dramatically decrease in modulus and demonstrate elastomer type properties. This allows them to be shaped or conformed from their original shape into a new shape or conformation. When the energy source is removed, and the temperature of the structure or article drops below the interpolymer's Tg, the structure or article then retains the new shape and regains its original engineering resin type properties. If the energy source is subsequently reapplied again sufficient to increase the temperature of the structure or article above the interpolymer's Tg, the structure or article then reverts back to its original shape or conformation in the absence of any restraining forces.

BACKGROUND OF THE INVENTION

Materials which have the ability to reversibly change shape on application of an energy source such as heat are known as "shape memory" materials. Certain metal alloys such as Cu—Al—Ni, Au—Cd, In—Ti, Ni—Ti, can exhibit this property and are therefore often used in applications such as temperature sensors. Uses for such shape memory metal alloys however has been limited due to the available temperature ranges of operation for these alloys, and the expense of the base metals.

As an alternative to metal alloys, a number of polymers are known to exhibit shape memory behavior. The key to such behavior is the morphology of the polymer above and below its glass transition temperature (Tg) and its ability to form a partially crystalline rubbery state between the fluid state and the glassy state. In this rubbery state, the polymer can quite easily be deformed into any new shape, and, when the polymer is cooled below its Tg, the deformation is fixed and the new shape is retained. At this stage the polymer lacks its rubbery elasticity and is rigid. However, the original shape can be recovered simply by heating the polymer once again to a temperature higher than the Tg. Thus it is crucial that the selection of a shape memory polymer used to prepare a fabricated article involves both a knowledge of the final modulus and stiffness required, as well as a comparison of the Tg of the polymer with the operating temperature range to be used in the articles fabrication, and the intended temperature range predicted for its application.

For instance, selection of shape memory polymers for use in toy applications will require the Tg of the polymer used to make the toy structure or fabricated article to be in a fairly narrow range slightly above room temperature, allowing for the application of safe and relatively gentle heating to transform the toy into its moldable state and new configuration. Similarly, simple cooling back to room temperature will result in the new configuration having the original stiffness and modulus. Recovery of the original toy shape or configuration will again require only the application of safe and relatively gentle heating.

To date there have been a number of disclosures of shape memory polymers and articles and applications therefrom. U.S. Pat. No. 5,189,110 describes a shape memory polymer resin composition which is an A-B-A block copolymer where block A is a homopolymer or copolymer of a vinyl aromatic compound (or a hydrogenated product thereof), and block B is a homopolymer or a copolymer of butadiene and/or a hydrogenated product thereof. U.S. Pat. No. 5,098,776 describes a shape memory fibrous sheet comprising a powder of shape memory polymers of urethane, styrene/butadiene, crystalline diene, or norbornane. U.S. Pat. No. 5,093,384 describes a heat insulator made of a shape memory polymer foam in which the polymer foam is a polyurethane containing approximately equal amounts of NCO and OH groups at the terminals of the molecular chains. U.S. Pat. No. 5,634,913 describes a softening conduit for carrying fluids into and out of the human body having a needle like structure in which the tip is formed from a shape memory polymer such as a polyurethane. U.S. Pat. No. 5,552,197 describes a dynamic polymer composite comprising a multitude of fibers within a polymer matrix which is made from a shape memory polymer. U.S. Pat. No. 5,049,591 describes an open or closed cell shape memory polymer foam prepared from polymers of urethane, styrenebutadiene, crystalline diene, or norbornane. U.S. Pat. No. 5,066,091 describes an amorphous memory polymer alignment device wherein the amorphous memory polymer constituent is a covalently cross-linked semi-crystalline polymer such as polyethylene or ethylvinyl acetate copolymers with the polymers of esters of methacrylic acid and aliphatic, or aromatic alcohols being particularly preferred. U.S. Pat. No. 5,445,140 describes an endoscopic surgical device in which the hinge member is manufactured from a shape memory polymer which is preferably a polyurethane. U.S. Pat. No. 5,192,301 describes a closing plug device having a flange or an enlarged end portion made of a shape memory polymer such as polynorbornene, styrene-butadiene copolymer, polyurethane, transpolyisoprene and the like.

Thus the majority of current shape memory polymers are derived from either urethane- or A-B-A block structure styrene/butadiene/styrene-polymers. Such polymers may additionally require a further cross-linking transformation to allow the polymer to exhibit the desired shape memory behavior, thus further restricting the choice of polymer for a given application. In addition, many polymers are required to have very high molecular weight to function in these applications (e.g. 2,000,000 or higher) which in turn severely limits their processability and hence their use in many forming processes. Finally, many applications for shape/memory polymers require a precise and often narrow operating temperature range and a specific or minimum modulus, whilst the current technologies offer only broad temperature operating windows.

Hence it would be desirable to have a shape memory polymer composition which does not require cross-linking, exhibits excellent processability, and which has the capacity for precisely tuning both its glass transition process (peak temperature, amplitude and width of transition) as well as the stiffness and modulus of the material in its final state.

There are a wide range of structures and fabricated articles which would benefit from being prepared from polymer compositions which can afford both Tg and modulus control and preferentially exhibit the shape memory property. Such structures and fabricated articles can include, but are not limited to, fibers, foams, films and molded materials.

Fibers are often classified in terms of their diameter which can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of about 15 or less. Microdenier (aka microfiber) generally refers to fiber having a diameter not greater than about 100 micrometers. The fiber can also be classified by the process by which it is made, such as monofilament, continuous wound fine filament, staple or short cut fiber, spun bond, and melt blown fiber. Fiber can also be classified by the number of regions or domains in the fiber.

The shape memory fibers of the present invention include the various homofil fibers made from the substantially random interpolymers or blend compositions therefrom. Homofil fibers are those fibers which have a single region (domain) and do not have other distinct polymer regions (as do bicomponent fibers). These homofil fibers include staple fibers, spunbond fibers or melt blown fibers (using, e.g., systems as disclosed in U.S. Pat. No. 4,340,563 (Appel et al.), U.S. Pat. No. 4,663,220 (Wisneski et al.), U.S. Pat. No. 4,668,566 (Braun), or U.S. Pat. No. 4,322,027 (Reba), all of which are incorporated herein by reference), and gel spun fibers (e.g., the system disclosed in U.S. Pat. No. 4,413,110 (Kavesh et al.), incorporated herein by reference). Staple fibers can be melt spun (i.e., they can be extruded into the final fiber diameter directly without additional drawing), or they can be melt spun into a higher diameter and subsequently hot or cold drawn to the desired diameter using conventional fiber drawing techniques.

The novel shape memory fibers disclosed herein can also be used as bonding fibers, especially where the novel fibers have a lower melting point than the surrounding matrix fibers. In a bonding fiber application, the bonding fiber is typically blended with other matrix fibers and the entire structure is subjected to heat, where the bonding fiber melts and bonds the surrounding matrix fiber. Typical matrix fibers which benefit from use of the novel shape memory fibers of the present invention include, but are not limited to, synthetic fibers, such as fibers made from, poly(ethylene terephthalate), polyproylene, nylon, other heterogeneously branched polyethylenes, linear and substantially linear ethylene interpolymers and polyethylene homopolymers. Also included are the various natural fibers which include, but are not limited to, those made from silk, wool, and cotton. The diameter of the matrix fiber can vary depending upon the end use application.

The shape memory fibers of the present invention also include the various composite bicomponent fibers which can comprise the substantially random interpolymers and a second polymer component. This second polymer component can be an ethylene or α-olefin homopolymer or interpolymer; an ethylene/propylene rubber (EPM), ethylene/propylene diene monomer terpolymer (EPDM), isotactic polypropylene; a styrene/ethylene-butene copolymer, a styrene/ethylene-propylene copolymer, a styrene/ethylene-butene/styrene (SEBS) copolymer, a styrene/ethylene-propylene/styrene (SEPS) copolymer; the acrylonitrile-butadiene-styrene (ABS) polymers, styrene-acrylonitrile (SAN), high impact polystyrene, polyisoprene, polybutadiene, natural rubbers, ethylene/propylene rubbers, ethylene/propylene diene (EPDM) rubbers, styrene/butadiene rubbers, thermoplastic polyurethanes, epoxies, vinyl ester resins, polyurethanes, phenolic resins, homopolymers or copolymers of vinyl chloride or vinylidene chloride, poly(methylmethacrylate), polyester, nylon-6, nylon-6,6, poly(acetal); poly(amide), poly(arylate), poly(carbonate), poly(butylene) and polybutylene, polyethylene terephthalates; or blend compositions therefrom. Preferably the second polymer component is an ethylene or α-olefin homopolymer or interpolymer, wherein said u-olefin has from 3 to 20 carbon atoms, or polyethylene terephthalate.

The bicomponent fibers have the two polymers in a co-continuous phase. Examples of such bicomponent fiber configurations and shapes include sheath/core fibers in which the perimeter shape is round, oval, delta, trilobal, triangular, dog-boned, or flat or hollow configurations. Other types of bicomponent fibers within the scope of the invention include such structures as segmented pies, as well as side-by-side fibers (e.g., fibers having separate regions of polymers, wherein the substantially random interpolymer comprises at least a portion of the fiber's surface). Also included are the "islands in the sea" bicomponent fibers in which a cross section of the fiber has a main matrix of the first polymer component dispersed across which are extruded domains of a second polymer. On viewing a cross section of such a fiber, the main polymer matrix appears as a "sea" in which the domains of the second polymer component appear as islands.

The bicomponent fibers of the present invention can be prepared by coextruding the substantially random interpolymers in at least one portion of the fiber and the second polymer component in at least one other portion of the fiber. For all configurations in a sheath/core bicomponent fiber (i.e., one in which the sheath concentrically surrounds the core), the substantially random interpolymer can be in either the sheath or the core. Different substantially random interpolymers can also be used independently as the sheath and the core in the same fiber, and especially where the sheath component has a lower melting point than the core component. In the case of segmented pie configurations, one or more of the segments can comprise the substantially random interpolymer. In the case of an "island in the sea" configuration, either the islands or the matrix can comprise the substantially random interpolymer. The bicomponent fiber can be formed under melt blown, spunbond, continuous filament or staple fiber manufacturing conditions.

The shape of the shape memory fibers of the present invention is not limited. For example, typical fibers have a circular cross sectional shape, but sometimes fibers have different shapes, such as a trilobal shape, or a flat (i.e., "ribbon" like) shape. The fiber disclosed herein is not limited by the shape of the fiber.

Finishing operations can optionally be performed on the shape memory fibers of the present invention. For example, the fibers can be texturized by mechanically crimping or forming such as described in Textile Fibers, Dyes, Finishes, and Processes: A Concise Guide, by Howard L. Needles, Noyes Publications, 1986, pp. 17–20.

The polymer compositions used to make the shape memory fibers of the present invention or the fibers themselves may be modified by various cross-linking processes using curing methods at any stage of the fiber preparation including, but not limited to, before during, and after drawing at either elevated or ambient temperatures. Such cross-linking processes include, but are not limited to, peroxide-, silane-, sulfur-, radiation-, or azide-based cure systems. A full description of the various cross-linking technologies is described in copending U.S. patent application Ser. Nos. 08/921,641 and 08/921,642 both filed on Aug. 27, 1997, the entire contents of both of which are herein incorporated by reference.

Dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The polymer compositions may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

The shape memory fibers of the present invention may be surface functionalized by methods including, but not limited to sulfonation, chlorination using chemical treatments for permanent surfaces or incorporating a temporary coating using the various well known spin finishing processes.

Fabrics made from such novel shape memory fibers include both woven and nonwoven fabrics. Nonwoven fabrics can be made variously, including spunlaced (or hydrodynamically entangled) fabrics as disclosed in U.S. Pat. No. 3,485,706 (Evans) and U.S. Pat. No. 4,939,016 (Radwanski et al.), the disclosures of which are incorporated herein by reference; by carding and thermally bonding homofil or bicomponent staple fibers; by spunbonding homofil or bicomponent fibers in one continuous operation; or by melt blowing homofil or bicomponent fibers into fabric and subsequently calandering or thermally bonding the resultant web. Other structures made from such fibers are also included within the scope of the invention, including e.g., blends of these novel shape memory fibers with other fibers (e.g., poly(ethylene terephthalate) (PET) or cotton or wool or polyester).

Woven fabrics can also be made which comprise the shape memory fibers of the present invention. The various woven fabric manufacturing techniques are well known to those skilled in the art and the disclosure is not limited to any particular method. Woven fabrics are typically stronger and more heat resistant and are thus used typically in durable, non-disposable applications as for example in the woven blends with polyester and polyester cotton blends. The woven fabrics comprising the shape memory fibers of the present invention can be used in applications including but not limited to, upholstery, athletic apparel, carpet, fabrics, bandages such as, for example, elastic and non-elastic joint support bandages, ACE™ bandages and the like.

The novel shape memory fibers and fabrics disclosed herein can also be used in various fabricated articles as described in U.S. Pat. No. 2,957,512 (Wade), the disclosure of which is incorporated herein by reference. Attachment of the novel shape memory fibers and/or fabric to fibers, fabrics or other articles can be done with melt bonding or with adhesives. Gathered or shirred articles can be produced from the new fibers and/or fabrics and other components by pleating the other component (as described in U.S. Pat. No. '512) prior to attachment, prestretching the novel shape memory fiber component prior to attachment, or heat shrinking the novel shape memory fiber component after attachment.

The novel shape memory fibers described herein also can be used in a spunlaced (or hydrodynamically entangled) process to make novel structures. For example, U.S. Pat. No. 4,801,482 (Goggans), the disclosure of which is incorporated herein by reference, discloses a sheet which can now be made with the novel shape memory fibers/fabric described herein.

Composites that utilize very high molecular weight linear polyethylene or copolymer polyethylene also benefit from the novel shape memory fibers disclosed herein. For example, for the novel shape memory fibers that have a low melting point, such that in a blend of the novel shape memory fibers and very high molecular weight polyethylene fibers (e.g., Spectra™ fibers made by Allied Chemical) as described in U.S. Pat. No. 4,584,347 (Harpell et al.), the disclosure of which is incorporated herein by reference, the lower melting fibers bond the high molecular weight polyethylene fibers without melting the high molecular weight fibers, thus preserving the high strength and integrity of the high molecular weight fiber.

The fibers and fabrics can have additional materials which do not materially affect their properties. Such useful non-limiting additive materials include pigments, antioxidants, stabilizers, surfactants (e.g., as disclosed in USP 4,486,552 (Niemann), U.S. Pat. No. 4,578,414 (Sawyer et al.) or U.S. Pat. No. 4,835,194 (Bright et al.), the complete disclosures of which are incorporated herein by reference).

Excellent teachings to processes for making ethylenic polymer foam structures and processing them are seen in C. P. Park, "Polyolefin Foam", Chapter 9, *Handbook of Polymer Foams and Technology,* edited by D. Klempner and K. C. Frisch, Hanser Publishers, Munich, Vienna, New York, Barcelona (1991), which is incorporated herein by reference.

Foam structures may take any physical configuration known in the art, such as sheet, plank, or bun stock. Other useful forms are expandable or foamable particles, moldable foam particles, or beads, and articles formed by expansion and/or coalescing and welding of those particles.

Foam structures may be made by a conventional extrusion foaming process. The structure is generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point.

Foam structures may also be formed in a coalesced strand form by extrusion of the ethylenic polymer material through a multi-orifice die. Apparatuses and methods for producing foam structures in coalesced strand form are seen in U.S. Pat. Nos. 3,573,152 and 4,824,720, both of which are incorporated herein by reference. Foam structures may also be formed by an accumulating extrusion process as seen in U.S. Pat. No. 4,323,528, which is incorporated by reference herein. Foam structures may also be formed into noncrosslinked foam beads suitable for molding into articles. This process is well taught in U.S. Pat. Nos. 4,379,859 and 4,464,484, which are incorporated herein by reference. In a derivative of this process, styrene monomer may be impregnated into the suspended pellets prior to impregnation with blowing agent to form a graft interpolymer with the ethylenic polymer material. The process of making the polyethylene/polystyrene interpolymer beads is described in U.S. Pat. No. 4,168,353, which is incorporated herein by reference.

The foam beads may then be molded by any means known in the art, such as charging the foam beads to the mold, compressing the mold to compress the beads, and heating the beads such as with steam to effect coalescing and welding of the beads to form the article. Some of the methods are taught in U.S. Pat. Nos. 3,504,068 and 3,953, 558). Excellent teachings of the above processes and molding methods are seen in C. P. Park, supra, p. 191, pp. 197–198, and pp. 227–229, which are incorporated herein by reference.

There are many types of molding operations which can be used to form the structures and fabricated articles of the present invention, including, but not limited to, casting from solution, thermoforming and various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics"), blow molding processes (e.g., that described in Modern Plastics Encyclopedia/89, Mid October 1988 Issue, Volume 65, Number 11, pp. 217–218, "Extrusion-Blow Molding"), compression molding, profile extrusion, sheet extrusion, film casting, coextrusion and multilayer extrusion, co-injection molding, lamination, film, spray coating, rotomolding and rotocasting.

However there remains a requirement for the such structures and fabricated articles prepared from polymer compositions which exhibit shape memory properties and have the ability to precisely tune both the glass transition process (location, amplitude and width of transition) in the vicinity of the ambient temperature (25° C.), and the stiffness and modulus of the material in its final state. It would also be advantageous to prepare such structures and/or fabricated articles from polymer compositions which are easily processable and which exhibit shape memory properties without the requirement for cross linking. For many applications it would be highly desirable for the Tg of the polymer used to prepare the structure or fabricated article to be just above ambient temperature allowing for their use in applications requiring rigidity at room temperature but with access to the easily shaped rubbery stage by gentle heating to just above the Tg. Also the structure or fabricated article could then be returned to its original conformation by the same degree of gentle heating.

The present invention relates to structures and fabricated articles prepared from polymer compositions which comprise at least one substantially random interpolymer comprising polymer units derived from one or more α-olefin monomers with one or more vinyl or vinylidene aromatic monomers and/or a hindered aliphatic or cycloaliphatic vinyl or vinylidene monomers or blends therefrom. Unique to these novel materials are the shape memory properties of the polymer, coupled with their capacity to precisely tune both the glass transition process (location, amplitude and width of transition) in the vicinity of the ambient temperature range, and the stiffness and modulus of the material in its final state. Both these factors can be controlled by varying the relative amount of α-olefin(s) and vinyl or vinylidene aromatic and/or hindered aliphatic vinyl or vinylidene monomers in the final interpolymer or blend therefrom. Further increase in the Tg of the polymer composition used in the present invention can be introduced by variation of the type of component blended with the substantially random interpolymer including the presence of one or more tackifiers in the final formulation.

In a particularly preferred embodiment, the structure is a fiber prepared from the substantially random interpolymers or blend composition a plurality of which are used to form a styleable doll hair at room temperature. The hair is termed styleable because the shape memory properties of said fibers allow the doll hair to be placed or styled into a new conformation by heating above room temperature and the polymer Tg, such that the fibers are in their rubbery or moldable state, placing the hair in a new conformation or style, and cooling back below the room temperature and polymer Tg such that the fibers retain their original stiffness and modulus thus fixing the hair into the new style or configuration. The original style or configuration can be recovered simply by reheating the hair above room temperature and the polymer Tg.

BRIEF SUMMARY OF THE INVENTION

The present invention pertains to a structures or fabricated articles having shape memory behavior (and processes for their preparation)comprising;

(A) from about 1 to 100 wt % (based on the combined weights of Components A and B) of at least one substantially random interpolymer having an $I_2$ of 0.1 to about 1,000 g/10 min and an $M_w/M_n$ of from about 1.5 to about 20, which comprises;
  (1) from about 38 to about 65 mol % of polymer units derived from;
    (a) at least one vinyl or vinylidene aromatic monomer, or
    (b) at least one hindered aliphatic or cycloaliphatic vinyl or vinylidene monomer, or
    (c) a combination of at least one aromatic vinyl or vinylidene monomer and at least one hindered aliphatic or cycloaliphatic vinyl or vinylidene monomer, and
  (2) from about 35 to about 62 mol % of polymer units derived from ethylene and/or at least one $C_{3-20}\alpha$-olefin; and
(B) from 0 to about 99 wt % (based on the combined weights of Components A and B) of at least one polymer other than that of Component A; and
(C) from 0 to about 50% by weight (based on the combined weights of components A, B, C and D) of at least one tackifier; and
(D) from 0 to about 80% by weight (based on the combined weights of components A, B, C and D) of at least one filler.

The structures of the present invention having shape memory properties can be fibers, foams, molded compositions, or fabricated articles. The fabricated articles can be made from said structures or directly from the substantially random interpolymer or blend composition.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "deformation" as used herein is defined as bending, elongation, or compression.

The term "conformability" as used herein is defined as deformation to a prescribed shape.

The term "timed recovery" as used herein is defined as return to the original shape in a prescribed amount of time.

The amount of deformation or conformation as used herein is defined as work which is equal to force multiplied by distance. The energy can come from any source, including heat energy, microwave energy, pressure, compression, and the like.

Suitable methods of applying heat energy as used herein include but are not limited to hot water, hot air, heat lamps, heating elements and the like.

The time element as used herein is both the "short" time the polymer requires to change modulus and the "extended" time that the polymer retains its new shape.

The term "shape memory behaviour" as used herein for fibers is characterized by the ability of a fiber of 2 mil in diameter, after heating at 98.6° F. for 30 sec, to be shaped into a new curled conformation by tightly wrapping around a circular rod of 5/16" diameter, and, after cooling to 25° C., to be removed from said rod and to still hold a curled conformation for >30 sec.

The term "shape memory behaviour" as used herein for molded structures or articles is characterized by the ability of a 0.5 inch by 5 inch by 0.075 inch thick ASTM flexural modulus test specimen to show;

1. A % decrease in modulus ($M_{dec}$) of greater than 80%, as determined by the equation:

$$M_{dec}=(M_{34}-M_{120})/M_{34}\times 100$$

where $M_{120}$ is the modulus measured after holding the specimen at 120° F. for 60 sec, and $M_{34}$ is the modulus measured after holding the specimen at 34° F. for 60 sec; and 2. The ability to hold a new shape for greater than 60 secs at 71° F. and for greater than 10 sec at 120° F. wherein said shape was formed by holding a 0.5 inch by 5 inch by 0.075 inch thick ASTM flexural modulus test specimen for 60 sec at 120° F., then bending the sample by the 5 inch length, end to end, and pinching the ends together with a clip, placing this in 34° F. cold water for 60 seconds followed by removing the clip, and timing how long is required to return the sample to its initial configuration at both 71° F. and at 120° F.

The preferred embodiment of the present invention describes structures and fabricated articles which exhibit shape memory properties in the vicinity of room temperature. Thus the tests for shape memory behavior defined herein are performed at 98.6° F. (37° C.), in the case of fibers, and 120° F. (49° C.), in the case of molded articles. However it is also recognized by those skilled in the art and encompassed in the present invention that substantially random interpolymers and blend compositions can encompass a wide Tg range, anywhere between −50° C. and +70° C. (−58° F. and +158° F.) and thus in many cases, have a Tg much greater or much lower than 120° F. Thus for such interpolymers and blends it is recommended that the heating step in the aforementioned tests be performed at a temperature between about 5° C. (41° F.) to about 25° C. (77° F.) above the polymer Tg, and the cooling step in the tests be performed at a temperature between about 2° C. (77° F.) to about 10° C. (77° F.) below the polymer Tg.

The term "substantially random" (in the substantially random interpolymer comprising polymer units derived from one or more α-olefin monomers with one or more vinyl or vinylidene aromatic monomers and/or a hindered aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in POLYMER SEQUENCE DETERMINATION. Carbon-13 NMR Method, Academic Press New York, 1977, pp. 71–78. Preferably, substantially random interpolymers do not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The term "structure" as used herein is defined as a polymer composition which has undergone a molding, film-, fiber-, or foam-forming process.

The term "fabricated article" as used herein is defined as a polymer composition in the form of a finished article which may be formed directly from said polymer composition or be formed from an intermediate comprising one of the structures described herein.

The Substantially Random Interpolymers

The interpolymers used to prepare the structures and fabricated articles of the present invention include interpolymers prepared by polymerizing one or more (X-olefins with one or more vinyl or vinylidene aromatic monomers and/or one or more hindered aliphatic or cycloaliphatic vinyl or vinylidene monomers, and optionally other polymerizable monomers.

Suitable α-olefins include for example, α-olefins containing from 2 to about 20, preferably from 2 to about 12, more preferably from 2 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the interpolymers include, for example, those represented by the following formula:

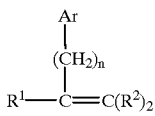

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl;

and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

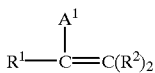

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched (α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

Although not a requirement for shape memory behavior, the substantially random interpolymers may also be modified by various cross-linking processes including, but not limited to peroxide-, silane-, sulfur-, radiation-, or azide-based cure systems. A full description of the various cross-linking technologies is described in copending U.S. patent application Ser. Nos. 08/921,641 and 08/921,642 both filed on Aug. 27, 1997, the entire contents of both of which are herein incorporated by reference.

Dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference.

For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106;

5,347,024; 5,350,723; 5,374,696; 5,399,635; 5,470,993; 5,703,187; and 5,721,185 all of which patents and applications are incorporated herein by reference.

The substantially random α-olefin/vinyl or vinylidene aromatic interpolymers can also be prepared by the methods described in JP 07/278230 employing compounds shown by the general formula

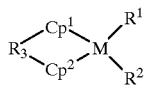

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random (α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

Also suitable are the substantially random interpolymers which comprise at least one α-olefin/vinyl aromatic/vinyl aromatic/u-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

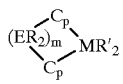

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each $R^1$ is independently, each occurrence, H, halo, hydrocarbyl, hyrocarbyloxy, silahydrocarbyl, hydrocarbylsilyl containing up to about 30 preferably from 1 to about more preferably from 1 to about 10 carbon or silicon atoms or two $R^1$ groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-C1–4 alkyl, racemic-(dimethylsilanediyl)-bis-(2-methyl-4-phenylindenyl)zirconium di-C1–4 alkoxide, or any combination thereof and the like.

It is also possible to use the titanium-based constrained geometry catalysts, [N-(1,1-dimethylethyl)-1,1-dimethyl-1-[(1,2,3,4,5-η)-1,5,6,7-tetrahydro-s-indacen-1-yl] silanaminato(2-)-N]titanium dimethyl; (1-indenyl)(tert-butylamido)dimethyl-silanetitaniumdimethyl; ((3-tert-butyl)(1,2,3,4,5-η)-1-indenyl)(tert-butylamido) dimethylsilane titanium dimethyl; and ((3-iso-propyl)(1,2,3, 4,5-η)-1-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460[1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si$ $(Me_4Cp)(N$-tert-butyl$)TiCl_2$/methylaluminoxane Ziegler- Natta catalysts. Copolymers of ethylene and styrene produced by bridged metallocene catalysts have been described by Arai, Toshiaki and Suzuki (*Polymer Preprints, Am. Chem. Soc. Div. Polym. Chem.*) Volume 38, pages 349, 350[1997]). The manufacture of α-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 AI to Denki KAGAKU KOGYO KK. All the above methods disclosed for preparing the interpolymer component are incorporated herein by reference. The random copolymers of ethylene and styrene as disclosed in Polymer Preprints Vol 39, No. 1, March 1998 by Toru Aria et al. can also be employed as blend components for the foams of the present invention.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent based on the total weight of the interpolymers of atactic vinyl or vinylidene aromatic homopolymer is present.

Blend Compositions Comprising the Substantially Random Interpolymers

The present invention also provides structures and fabricated articles prepared from shape memory polymers prepared from blends of the substantially random α-olefin/vinyl or vinylidene interpolymers with one or more other polymer components which span a wide range of compositions.

When the structure or fabricated article comprises a fiber, it is understood that said fiber can be prepared directly from the blended polymer composition or be prepared by combining pre-formed fibers of the substantially random interpolymer and the other polymer component. When the fiber has a bicomponent structure, then either the core or the sheath can comprise either the substantially random interpolymer and the other polymer component.

The other polymer component of the blend can include, but is not limited to, one or more of an engineering thermoplastic, an α-olefin homopolymer or interpolymer, a thermoplastic olefin, a styrenic block copolymer, a styrenic copolymer, an elastomer, a thermoset polymer, or a vinyl halide polymer.

Engineering Thermoplastics

The third edition of the Kirk-Othmer Encyclopedia of Science and Technology defines engineering plastics as thermoplastic resins, neat or unreinforced or filled, which maintain dimensional stability and most mechanical properties above 100° C. and below 0° C. The terms "engineering plastics" and "engineering thermoplastics", can be used interchangeably. Engineering thermoplastics include acetal and acrylic resins, polyamides (e.g. nylon-6, nylon 6,6,), polyimides, polyetherimides, cellulosics, polyesters, poly (arylate), aromatic polyesters, poly(carbonate), poly (butylene) and polybutylene and polyethylene terephthalates, liquid crystal polymers, and selected polyolefins, blends, or alloys of the foregoing resins, and some examples from other resin types (including e.g. polyethers) high temperature polyolefins such as polycyclopentanes, its copolymers, and polymethylpentane.).

A preferred engineering thermoplastic, when the structure or fabricated article comprises a fiber, are the polyesters.

Polyesters may be made by the self-esterification of hydroxycarboxylic acids, or by direct esterification, which involves the step-growth reaction of a diol with a dicarboxylic acid with the resulting elimination of water, giving a polyester with an—[-AABB-]—repeating unit. The reaction may be run in bulk or in solution using an inert high boiling solvent such as xylene or chlorobenzene with azeotropic removal of water.

Alternatively, but in like manner, ester-formning derivatives of a dicarboxylic acid can be heated with a diol to obtain polyesters in an ester interchange reaction. Suitable acid derivatives for such purpose are alkyl esters, halides, salts or anhydrides of the acid. Preparation of polyarylates, from a bisphenol and an aromatic diacid, can be conducted in an interfacial system which is essentially the same as that used for the preparation of polycarbonate.

Polyesters can also be produced by a ring-opening reaction of cyclic esters or C4–C7 lactones, for which organic tertiary amine bases phosphines and alkali and alkaline earth metals, hydrides and alkoxides can be used as initiators. Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene arylenedicarboxylate), a poly(arylene alkanedicarboxylate), or a poly(arylene arylenedicarboxylate) is therefore appropriate for use herein. Alkyl portions of the polymer chain can be substituted with, for example, halogens, C1–C8 alkoxy groups or C1–C8 alkyl side chains and can contain divalent heteroatomic groups (such as —O—, —Si—, —S— or —SO$_2$—) in the paraffinic segment of the chain. The chain can also contain unsaturation and C6–C10 non-aromatic rings. Aromatic rings can contain substituents such as halogens, C1–C8 alkoxy or C1–C8 alkyl groups, and can be joined to the polymer backbone in any ring position and directly to the alcohol or acid functionality or to intervening atoms.

Typical aliphatic diols used in ester formation are the C2–C10 primary and secondary glycols, such as ethylene-, propylene-, and butylene glycol.

Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl) propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethanol together with ethylene glycol in esterification with terephthalic acid forms a clear, amorphous copolyester of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene arylenedicarboxylates) polyethylene terephthalate and polybutylene terephthalate, or mixtures thereof, are particularly useful in this invention. A polyester suitable for use herein may have an intrinsic viscosity of about 0.4 to 1.2, although values outside this range are permitted as well.

Methods and materials useful for the production of polyesters, as described above, are discussed in greater detail in Whinfield, U.S. Pat. No. 2,465,319, Pengilly, U.S. Pat. No. 3,047,539, Schwarz, U.S. Pat. No. 3,374,402, Russell, U.S. Pat. No. 3,756,986 and East, U.S. Pat. No. 4,393,191.

An especially preferred engineering thermoplastic are the acrylic resins which derive from the peroxide-catalyzed free radical polymerization of methyl methacrylate (MMA). As described by H. Luke in Modem Plastics Encyclopedia, 1989, pps 20–21, MMA is usually copolymerized with other acrylates such as methyl- or ethyl acrylate using four basic polymerization processes, bulk, suspension, emulsion and solution. Acrylics can also be modified with various ingredients including butadiene, vinyl and butyl acrylate. Acrylics known as PMMA have ASTM grades and specifications. Grades 5, 6 and 8 vary mainly in deflection temperature under load (DTL) requirements. Grade 8 requires a tensile strength of 9,000 psi vs 8,000 psi for Grades 5 and 6. The DTL varies from a minimum requirement of 1 53° F. to a maximum of 189° F., under a load of 264 p.s.i. Certain grades have a DTL of 212° F. Impact-modified grades range from an Izod impact of 1.1 to 2.0 ft lb/in for non-weatherable transparent materials. The opaque impact-modified grades can have Izod impact values as high as 5.0 ft lb/in.

We have surprisingly found that for the shape memory structures of the present invention, the addition of polymethylmethacrylate (PMMA) to the substantially random interpolymer or blend composition, increases gloss and modulus and improves the resulting handling characteristics (i.e. molded articles and films have a lower tendency to stick together in shipping and storage and fibers have a lower tendency to stick together in procedures such as carding and/or combing.).

The α-Olefin Homopolymers and Interpolymers

The (α-olefin homopolymers and interpolymers comprise polypropylene, propylene/$C_4$–$C_{20}$ α-olefin copolymers, polyethylene, and ethylene/$C_3$–$C_{20}$ α-olefin copolymers, the interpolymers can be either heterogeneous ethylene/α-olefin interpolymers or homogeneous ethylene/α-olefin interpolymers, including the substantially linear ethylene/α-olefin interpolymers.

Heterogeneous interpolymers are differentiated from the homogeneous interpolymers in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks) by DSC. The heterogeneous interpolymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The Ziegler catalysts suitable for the preparation of the heterogeneous component of the current invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Suitable catalyst materials may also be derived from a inert oxide supports and transition metal compounds. Examples of such compositions suitable for use in the solution polymerization process are described in U.S. Pat. No. 5,420,090 (Spencer. et al.), the teachings of which are incorporated herein by reference.

The heterogeneous polymer component can be an α-olefin homopolymer preferably polyethylene or polypropylene, or, preferably, an interpolymer of ethylene with at least one $C_3$–$C_{20}$ α-olefin and/or $C_4$–$C_{18}$ diolefins. Heterogeneous copolymers of ethylene and 1-octene are especially preferred.

The relatively recent introduction of metallocene-based catalysts for ethylene/α-olefin polymerization has resulted in the production of new ethylene interpolymers and new requirements for compositions containing these materials. Such polymers are known as homogeneous interpolymers and are characterized by their narrower molecular weight and composition distributions (defined as the weight percent of the polymer molecules having a comonomer content within 50 percent of the median total molar comonomer content) relative to, for example, traditional Ziegler catalyzed heterogeneous polyolefin polymers. Generally blown and cast film made with such polymers are tougher and have better optical properties and heat sealability than film made with Ziegler Natta catalyzed LLDPE. It is known that metallocene LLDPE offers significant advantages over Ziegler Natta produced LLDPE's in cast film for pallet wrap applications, particularly improved on-pallet puncture resistance. Such metallocene LLDPE's however have a significantly poorer processability on the extruder than Ziegler Natta products.

The substantially linear ethylene/α-olefin polymers and interpolymers of the present invention are herein defined as in U.S. Pat. No. 5,272,236 (Lai et al.), and in U.S. Pat. No. 5,272,872, the entire contents of which are incorporated by reference. The substantially linear ethylene/α-olefin polymers are also metallocene based homogeneous polymers, as the comonomer is randomly distributed within a given interpolymer molecule and wherein substantially all of the interpolymer molecules have the same ethylene/comonomer ratio within that interpolymer. Such polymers are unique however due to their excellent processability and unique rheological properties and high melt elasticity and resistance to melt fracture.

These polymers can be successfully prepared in a continuous polymerization process using the constrained geometry metallocene catalyst systems.

The substantially linear ethylene/α-olefin polymers and are those in which the comonomer is randomly distributed within a given interpolymer molecule and wherein substantially all of the interpolymer molecules have the same ethylene/comonomer ratio within that interpolymer.

The term "substantially linear" ethylene/α-olefin interpolymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least one carbon more than two carbons less than the total number of carbons in the comonomer, for example, the long chain branch of an ethylene/octene substantially linear ethylene interpolymer is at least seven (7) carbons in length (i.e., 8 carbons less 2 equals 6 carbons plus one equals seven carbons long chain branch length). The long chain branch can be as long as about the same length as the length of the polymer back-bone. Long chain branching is determined by using $^{13}C$ nuclear magnetic resonance (NMR) spectroscopy and is quantified using the method of Randall (*Rev. Macromol. Chem. Phys.,* C29 (2&3), p. 285–297), the disclosure of which is incorporated herein by reference. Long chain branching, of course, is to be distinguished from short chain branches which result solely from incorporation of the comonomer, so for example the short chain branch of an ethylene/octene substantially linear polymer is six carbons in length, while the long chain branch for that same polymer is at least seven carbons in length.

The "Theological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science,* Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of $2.15 \times 10^6$ dyne/cm². The novel substantially linear ethylene/α-olefin interpolymers described herein preferably have a PI in the range of about 0.01 kpoise to about 50 kpoise, preferably about 15 kpoise or less. The novel substantially linear ethylene/α-olefin polymers described herein have a PI less than or equal to about 70 percent of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology,* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/α-olefin interpolymers is at least 50 percent greater than the critical shear rate at the onset of surface melt fracture of a linear ethylene/α-olefin polymer having about the same $I_2$ and $M_w/M_n$, wherein "about the same" as used herein means that each value is within 10 percent of the comparative value of the comparative linear ethylene polymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.,* Vol. 20, p. 441 (1982), in U.S. Pat. No. 4,798,081 (Hazlitt et al.), or as is described in U.S. Pat. No. 5,008,204 (Stehling), the disclosure of which is incorporated herein by reference. The technique for calculating CDBI is described in U.S. Pat. No. 5,322,728 (Davey et al. ) and in U.S. Pat. No. 5,246,783 (Spenadel et al.). or in U.S. Pat. No. 5,089,321 (Chum et al.) the disclosures of all of which are incorporated herein by reference. The SCBDI or CDBI for the substantially linear olefin interpolymers used in the present invention is preferably greater than about 30 percent, especially greater than about 50 percent. The substantially linear ethylene/α-olefin interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The substantially linear ethylene/α-olefin polymers also do not contain any highly short chain branched fraction (i.e., they do not contain a polymer fraction with a degree of branching equal to or more than 30 methyls/1000 carbons).

The catalysts used to prepare the homogeneous interpolymers for use as blend components in the present invention are metallocene catalysts. These metallocene catalysts include the bis(cyclopentadienyl)-catalyst systems and the mono(cyclopentadienyl) Constrained Geometry catalyst systems (used to prepare the substantially linear ethylene/α-olefin polymers). Such constrained geometry metal complexes and methods for their preparation are disclosed in U.S. application Ser. No. 545,403, filed Jul. 3, 1990 (EP-A-416,815); U.S. application Ser. No. 547,718, filed Jul. 3, 1990 (EP-A-468,651); U.S. application Ser. No. 702,475, filed May 20, 1991 (EP-A-514,828); U.S. application Ser. No. 876,268, filed May 1, 1992, (EP-A-520,732); U.S. application Ser. No. 8,003, filed Jan. 21, 1993 (WO93/19104); U.S. application Ser. No. 08/241,523,(WO95/00526); as well as U.S. Pat. No. 5,055,438, U.S. Pat. No. 5,057,475, U.S. Pat. No. 5,096,867, U.S. Pat. No. 5,064,802, and U.S. Pat. No. 5,132,380.

In EP-A 418,044, published Mar. 20, 1991 (equivalent to U.S. Ser. No. 07/758,654) and in U.S. Ser. No. 07/758,660 certain cationic derivatives of the foregoing constrained geometry catalysts that are highly useful as olefin polymerization catalysts are disclosed and claimed. In U.S. Ser. No. 720,041, filed Jun. 24, 1991, certain reaction products of the foregoing constrained geometry catalysts with various boranes are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States patent applications, issued United States patents and published European Patent Applications are herein incorporated in their entirety by reference thereto.

The homogeneous polymer component can be an $\alpha$-olefin homopolymer preferably polyethylene or polypropylene, or, preferably, an interpolymer of ethylene with at least one $C_3$–$C_{20}$ $\alpha$-olefin and/or $C_4$–$C_{18}$ diolefins. Homogeneous copolymers of ethylene and 1-octene are especially preferred.

Thermoplastic Olefins

Thermoplastic olefins (TPOs) are generally produced from propylene homo- or copolymers, or blends of an elastomeric material such as ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and instrument panels, and also potentially in wire and cable The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the TPO formulations disclosed herein. In-reactor TPO's can also be used as blend components of the present invention. A complete discussion of various polypropylene polymers is contained in *Modern Plastics Encyclopedia*/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as 12). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 35 g/10 min, preferably from about 0.5 g/10 min to about 25 g/10 min, and especially from about 1 g/10 min to about 20 g/10 min.

Styrenic Block Copolymers

Also included are block copolymers having unsaturated rubber monomer units including, but not limited to, styrene-butadiene (SB), styrene-isoprene(SI), styrene-butadiene-styrene (SBS), styrene-isoprene-styrene (SIS), $\alpha$-methylstyrene-butadiene-$\alpha$-methylstyrene and $\alpha$-methylstyrene-isoprene-$\alpha$-methylstyrene.

The styrenic portion of the block copolymer is preferably a polymer or interpolymer of styrene and its analogs and homologs including $\alpha$-methylstyrene and ring-substituted styrenes, particularly ring-methylated styrenes. The preferred styrenics are styrene and $\alpha$-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Styrenic Copolymers

In addition to the block copolymers are the acrylonitrile-butadiene-styrene (ABS) polymers, styrene-acrylonitrile (SAN), and rubber modified styrenics including high impact polystyrene.

Elastomers

The elastomers include, but are not limited to, rubbers such as polyisoprene, polybutadiene, natural rubbers, ethylene/propylene rubbers, ethylene/propylene diene (EPDM) rubbers, styrene/butadiene rubbers, thermoplastic polyurethanes.

Thermoset Polymers

The thermoset polymers include but are not limited to epoxies, vinyl ester resins, polyurethanes, and phenolics.

Vinyl Halide Polymers

Vinyl halide homopolymers and copolymers are a group of resins which use as a building block the vinyl structure $CH_2=CXY$, where X is selected from the group consisting of F, Cl, Br, and I and Y is selected from the group consisting of F, Cl, Br, I and H.

The vinyl halide polymer component of the blends of the present invention include but are not limited to homopolymers and copolymers of vinyl halides with copolymerizable monomers such as $\alpha$-olefins including but not limited to ethylene, propylene, vinyl esters of organic acids containing 1 to 18 carbon atoms, e.g. vinyl acetate, vinyl stearate and so forth; vinyl chloride, vinylidene chloride, symmetrical dichloroethylene; acrylonitrile, methacrylonitrile; alkyl acrylate esters in which the alkyl group contains 1 to 8 carbon atoms, e.g. methyl acrylate and butyl acrylate; the corresponding alkyl methacrylate esters; dialkyl esters of dibasic organic acids in which the alkyl groups contain 1–8 carbon atoms, e.g. dibutyl fumarate, diethyl maleate, and so forth.

Preferably the vinyl halide polymers are homopolymers or copolymers of vinyl chloride or vinylidene chloride. Poly (vinyl chloride) polymers (PVC) can be further classified into two main types by their degree of rigidity. These are "rigid" PVC and "flexible" PVC. Flexible PVC is distinguished from rigid PVC primarily by the presence of and amount of plasticizers in the resin. Flexible PVC typically has improved processability, lower tensile strength and higher elongation than rigid PVC.

Of the vinylidene chloride homopolymers and copolymers (PVDC), typically the copolymers with vinyl chloride, acrylates or nitriles are used commercially and are most preferred. The choice of the comonomer significantly affects the properties of the resulting polymer. Perhaps the most notable properties of the various PVDC's are their low permeability to gases and liquids, barrier properties; and chemical resistance.

Also included are the various PVC and PVCD formulations containing minor amounts of other materials present to modify the properties of the PVC or PVCD, including but not limited to polystyrene, styrenic copolymers, polyolefins including homo and copolymers comprising polyethylene, and or polypropylene, and other ethylene/α-olefin copolymers, polyacrylic resins, butadiene-containing polymers such as acrylonitrile butadiene styrene terpolymers (ABS), and methacrylate butadiene styrene terpolymers (MBS), and chlorinated polyethylene (CPE) resins and the like.

Also included in the family of vinyl halide polymers for use as blend components of the present invention are the chlorinated derivatives of PVC typically prepared by post chlorination of the base resin and known as chlorinated PVC, (CPVC). Although CPVC is based on PVC and shares some of its characteristic properties, CPVC is a unique polymer having a much higher melt temperature range (410–450° C.) and a higher glass transition temperature (239–275° F.) than PVC.

The compositions comprising at least one substantially random interpolymer used to prepare the structures and fabricated articles of the present invention in addition to optionally comprising one or more of another polymer components can optionally comprise one or more tackifiers.

Tackifiers

Tackifiers can also be added to the polymer compositions used to prepare the structures and fabricated articles of the present invention in order to alter the Tg and thus extend the available application temperature window.

A suitable tackifier may be selected on the basis of the criteria outlined by Hercules in J. Simons, *Adhesives Age*, "The HMDA Concept: A New Method for Selection of Resins", November 1996. This reference discusses the importance of the polarity and molecular weight of the resin in determining compatibility with the polymer.

In the case of substantially random interpolymers of at least one α-olefin and a vinyl aromatic monomer, preferred tackifiers will have some degree of aromatic character to promote compatibility, particularly in the case of substantially random interpolymers having a high content of the vinyl aromatic monomer. As an initial indicator, compatible tackifiers are those which are also known to be compatible with ethylene/vinyl acetate having 28 weight percent vinyl acetate.

Tackifying resins can be obtained by the polymerization of petroleum and terpene feedstreams and from the derivatization of wood, gum, and tall oil rosin. Several classes of tackifiers include wood rosin, tall oil and tall oil derivatives, and cyclopentadiene derivatives, such as are described in United Kingdom patent application GB 2,032,439A. Other classes of tackifiers include aliphatic $C_5$ resins, polyterpene resins, hydrogenated resins, mixed aliphatic-aromatic resins, rosin esters, natural and synthetic terpenes, terpene-phenolics, and hydrogenated rosin esters.

Rosin is a commercially available material that occurs naturally in the oleo rosin of pine trees and typically is derived from the oleo resinous exudate of the living tree, from aged stumps and from tall oil produced as a by-product of kraft paper manufacture. After it is obtained, rosin can be treated by hydrogenation, dehydrogenation, polymerization, esterification, and other post treatment processes. Rosin is typically classed as a gum rosin, a wood rosin, or as a tall oil rosin which indicate its source. The materials can be used unmodified, in the form of esters of polyhydric alcohols, and can be polymerized through the inherent unsaturation of the molecules. These materials are commercially available and can be blended into the compositions using standard blending techniques. Representative examples of such rosin derivatives include pentaerythritol esters of tall oil, gum rosin, wood rosin, or mixtures thereof.

Examples of the various classes of tackifiers include, but are not limited to, aliphatic resins, polyterpene resins, hydrogenated resins, mixed aliphatic-aromatic resins, styrene/α-methylene styrene resins, pure monomer hydrocarbon resin, hydrogenated pure monomer hydrocarbon resin, modified styrene copolymers, pure aromatic monomer copolymers, and hydrogenated aliphatic hydrocarbon resins.

Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™, Marukarez™, Arkon™, Quintone™, Wingtack™, etc. One particularly preferred class of tackifiers includes the styrene/α-methylene stryene tackifiers available from Hercules. Particularly suitable classes of tackifiers include Wingtack™ 86 and Hercotac™ 1149, Eastman H-130, and styrene/α-methyl styrene tackifiers. Other preferred tackifiers are Piccotex 75, a pure monomer hydrocarbon resin having a glass transition temperature of 33° C., available from Hercules, Regalrez™ 1139 which is prepared by polymerization and hydrogenation of pure monomer hydrocarbon, , Picotex™ 120 which is a copolymer of modified styrene, Kristalex™ 5140 which is a copolymer of the pure aromatic monomers, Plastolyn™ 140 which is a hydrogenated aliphatic hydrocarbon resin, and Endex™ 155 which is a copolymer of the pure aromatic monomers. Of these Kristalex™ 5140, Plastolyn™ 140, and Endex™ 155 are preferred and Endex™ 155 is most preferred.

Other Additives

Additives such as antioxidants (e.g., hindered phenols such as, for example, Irganox® 1010), phosphites (e.g., Irgafos® 168), u.v. stabilizers, cling additives (e.g., polyisobutylene), slip agents (such as erucamide and/or stearamide), antiblock additives, colorants, pigments, and the like can also be included in the interpolymers and/or blends employed to prepare the structures and fabricated articles of the present invention, to the extent that they do not interfere with the properties of the substantially random interpolymers. Processing aids, which are also referred to herein as plasticizers, are optionally provided to reduce the viscosity of a composition, and include the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil (such as Kaydol™ oil (available from Witco), and Shellflex™ 371 naphthenic oil (available from Shell Oil Company). Another suitable oil is Tuflo™ oil (available from Lyondell).

Also included as a potential component of the polymer compositions used in the present invention are various organic and inorganic fillers, the identity of which depends upon the type of application in the blend is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Other representative organic or inorganic, fiber or mineral, fillers include carbonates such as barium, calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, mica, clay (kaolin or calcined kaolin), calcium silicate, feldspar, glass (ground or flaked glass or hollow glass spheres or microspheres or beads, whiskers or filaments), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

These additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. When a processing aid is employed, it will be present in the composition of the invention in an amount of at least 5 percent. The processing aid will typically be present in an amount of no more than 60, preferably no more than 30, and most preferably no more than 20 weight percent.

Preparation of the Blends Comprising the Substantially Random Interpolymers

The blended polymer compositions used to prepare the fabricated articles of the present invention can be prepared by any convenient method, including dry blending the individual components and subsequently melt mixing or melt compounding in a Haake torque rheometer or by dry blending without melt blending followed by part fabrication, either directly in the extruder or mill used to make the finished article (e.g., the automotive part), or by pre-melt mixing in a separate extruder or mill (e.g., a Banbury mixer), or by solution blending, or by compression molding, or by calendering.

Preparation of the Structures Used To Form Fabricated Articles of the Present Invention Molded Articles The structures and fabricated articles of the present invention, can be prepared by many molding operations known to those skilled in the art including, but not limited to, casting from solution, thermoforming, the various injection molding and blow molding processes, compression molding, profile extrusion, sheet extrusion, film casting, coextrusion and multilayer extrusion, co-injection molding, lamination, film, spray coating, rotomolding and rotocasting.

Foams

Also included in the shape memory structures of the present invention are foams comprising the substantially random interpolymers in either a cross-linked or uncross-linked form or blends therefrom which takes on a deformed shape and an as-molded shaped, said deformed shape being produced when the polymer foam is compressed at a temperature higher than the glass transition point (Tg) of the polymer and then kept compressed at a temperature lower than the Tg until the compression sets, said as-molded shape being produced when the compressed polymer foam is heated again to a temperature higher than the Tg until it recovers its original shape. The foamed composition can be utilized in the form of a single layer or as a layer in a multi-layer structure. Excellent teachings to processes for making ethylenic polymer foam structures and processing them are seen in C. P. Park, "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated herein by reference.

The shape memory foam structures may be made by any conventional extrusion foaming processes, including their production in coalesced strand form, or by an accumulating extrusion process, or by forming foam beads suitable for molding into blocks or shaped articles by suitable molding methods known in the art.

Blowing agents useful in making the shape memory foam structures include inorganic agents, organic blowing agents and chemical blowing agents. Suitable inorganic blowing agents include carbon dioxide, nitrogen, argon, water, air, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane(HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. Preferred blowing agents include isobutane, HFC-152a, and mixtures of the foregoing.

The amount of blowing agents incorporated into the substantially random interpolymer melt material to make a foam-forming polymer gel is from about 0.2 to about 5.0, preferably from about 0.5 to about 3.0, and most preferably from about 1.0 to 2.50 gram moles per kilogram of polymer.

Various additives may be incorporated in the present foam structures such as stability control agents, nucleating agents, inorganic fillers, pigments, antioxidants, acid scavengers, ultraviolet absorbers, flame retardants, processing aids, extrusion aids, and the like.

A stability control agent may be added to the present foam to enhance dimensional stability. Preferred agents include amides and esters of $C_{10}$–$C_{24}$ fatty acids. Such agents are seen in U.S. Pat. Nos. 3,644,230 and 4,214,054, which are incorporated herein by reference. Most preferred agents include stearyl stearamide, glycerol monostearate, glycerol monobehenate, and sorbitol monostearate. Typically, such stability control agents are employed in an amount ranging from about 0.1 to about 10 parts per hundred parts of the polymer.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

Fibers and/or Fabricated Articles

The fiber can be prepared as monofilament, continuous wound fine filament, staple or short cut fiber, spun bond, and melt blown fiber. The shape memory fibers of the present invention include the various homofil fibers made from the substantially random interpolymers or blend compositions therefrom including staple fibers, spunbond fibers or melt blown. Staple fibers can be melt spun or can also be used as bonding fibers, especially where the novel fibers have a lower melting point than the surrounding matrix fibers.

The shape memory fibers of the present invention also include the various bicomponent fibers which can also be made from the novel substantially random interpolymers or blend compositions therefrom comprising at least one of the components.

Finishing operations can optionally be performed on the shape memory fibers of the present invention. For example, the fibers can be texturized by mechanically crimping or forming. The polymer compositions used to make the shape memory fibers of the present invention or the fibers themselves may also be modified by various cross-linking processes using curing methods described herein at any stage of the fiber preparation including, but not limited to, before during, and after drawing at either elevated or ambient temperatures. The polymer compositions may also be modified by various cross-linking processes described herein or surface functionalized by methods including, but not limited to sulfonation, chlorination using chemical treatments for permanent surfaces or incorporating a temporary coating using the various well known spin finishing processes.

Fabrics made from such novel shape memory fibers include, but are not limited to, both woven and nonwoven fabrics, but not limited to, upholstery, athletic apparel, carpet, fabrics, bandages.

Properties of the Shape Memory Interpolymers and Blend Compositions and The Structures and Fabricated Articles of the Present Invention The polymer compositions used to prepare the structures and fabricated articles of the present invention comprise from about 1 to 100, preferably from about 10 to 100, more preferably from about 50 to 100, even more preferably from about 80 to 100 wt %, (based on the combined weights of this component and the polymer component other than the substantially random interpolymer) of one or more interpolymers of one or more α-olefins and one or more vinyl or vinylidene aromatic monomers and/or one or more hindered aliphatic or cycloaliphatic vinyl or vinylidene monomers.

The substantially random interpolymer can be used as a minor component of a multi-component blend when used as for example, a compatabilizer or bonding component, it can be present in amounts even more preferably from about 80 to 100 wt %, (based on the combined weights of this component and the polymer component other than the substantially random interpolymer).

These substantially random interpolymers usually contain from about 38 to about 65 preferably from about 45 to about 55, more preferably from about 48 to about 55 mole percent of at least one vinyl or vinylidene aromatic monomer and/or hindered aliphatic or cycloaliphatic vinyl or vinylidene monomer and from about 35 to about 62, preferably from about 45 to about 55, more preferably from about 45 to about 52 mole percent of at least one aliphatic α-olefin having from 2 to about 20 carbon atoms.

The number average molecular weight (Mn) of the substantially random interpolymer used to prepare the shape memory structures and fabricated articles of the present invention is greater than about 1000, preferably from about 5,000 to about 500,000, more preferably from about 10,000 to about 300,000.

The melt index ($I_2$) of the substantially random interpolymer used to prepare the shape memory structures and fabricated articles of the present invention is from about 0.1 to about 1,000, preferably of from about 0.5 to about 200, more preferably of from about 0.5 to about 100 g/10 min.

The molecular weight distribution ($M_w/M_n$) of the substantially random interpolymer used to prepare the shape memory structures and fabricated articles of the present invention is from about 1.5 to about 20, preferably of from about 1.8 to about 10, more preferably of from about 2 to about 5.

The density of the substantially random interpolymer used to prepare the shape memory fibers of the present invention is greater than about 0.930, preferably from about 0.930 to about 1.045, more preferably of from about 0.930 to about 1.040, most preferably of from about 0.930 to about 1.030 g/cm$^3$.

The polymer compositions used to prepare the fibers of the present invention can also comprise from 0 to about 99, preferably from 0 to about 90, more preferably from 0 to about 50, even more preferably 0 to about 20 percent of by weight of at least one polymer other than the substantially random interpolymer (based on the combined weights of this component and the substantially random interpolymer) which can comprise a homogenous α-olefin homopolymer or interpolymer comprising polypropylene, propylene/ $C_4$–$C_{20}$ α-olefin copolymers, polyethylene, and ethylene/ $C_3$–$C_{20}$ α-olefin copolymers, the interpolymers can be either heterogeneous ethylene/α-olefin interpolymers, preferably a heterogenous ethylene/$C_3$–$C_8$ α-olefin interpolymer, most preferably a heterogenous ethylene/octene-1 interpolymer or homogeneous ethylene/α-olefin interpolymers, including the substantially linear ethylene/α-olefin interpolymers, preferably a substantially linear ethylene/α-olefin interpolymer, most preferably a substantially linear ethylene/$C_3$–$C_8$ α-olefin interpolymer; or a heterogenous ethylene/α-olefin interpolymer; or a thermoplastic olefin, preferably an ethylene/propylene rubber (EPM) or ethylene/ propylene diene monomer terpolymer (EPDM) or isotactic polypropylene, most preferably isotactic polypropylene; or a styreneic block copolymer, preferably styrene-butadiene (SB), styrene-isoprene(SI), styrene-butadiene-styrene (SBS), styrene-isoprene-styrene (SIS) or styrene-ethylene/ butene-styrene (SEBS) block copolymer, most preferably a styrene-butadiene-styrene (SBS) copolymer; or styrenic homopolymers or copolymers, preferably polystyrene, high impact polystyrene, polyvinyl chloride, copolymers of styrene and at least one of acrylonitrile, meth-acrylonitrile, maleic anhydride, or α-methyl styrene, most preferably polystyrene, or elastomers, preferably polyisoprene, polybutadiene, natural rubbers, ethylene/propylene rubbers, ethylene/propylene diene (EPDM) rubbers, styrene/ butadiene rubbers, thermoplastic polyurethanes, most preferably thermoplastic polyurethanes; or thermoset polymers, preferably epoxies, vinyl ester resins, polyurethanes, phenolics, most preferably polyurethanes; or vinyl halide homopolymers and copolymers, preferably homopolymers or copolymers of vinyl chloride or vinylidene chloride or the chlorinated derivatives therefrom, most preferably poly (vinyl chloride) and poly (vinylidene chloride); or engineering thermosplastics, preferably poly(methylmethacrylate) (PMMA), cellulosics, nylons, poly(esters), poly(acetals); poly(amides),the poly(arylate), aromatic polyesters, poly (carbonate), poly(butylene) and polybutylene and polyethylene terephthalates, most preferably poly (methylmethacrylate) (PMMA), and poly(esters).

The polymer composition used to prepare the homofil fibers of the present invention can also comprise from 0 to about 50, preferably from 5 to about 50, more preferably from 10 to about 40% by weight (based on the final weight of the polymer or polymer blend) of one or more tackifiers comprising aliphatic resins, polyterpene resins, hydrogenated resins, mixed aliphatic-aromatic resins, styrene/α-methylene styrene resins, pure monomer hydrocarbon resin, hydrogenated pure monomer hydrocarbon resin, modified styrene copolymers, pure aromatic monomer copolymers, and hydrogenated aliphatic hydrocarbon resins.

For the bicomponent fibers of the present invention the first component comprises a substantially random interpolymer having the compositions and properties as used to prepare the homofil fibers of the present invention and present in an amount of from about 5 to about 95, preferably from about 25 to about 95, most preferably from about 50 to about 95 wt % (based on the combined weight of the first and second components of the bicomponent fiber). The second component is present in an amount of from about 5 to about 95, preferably from about 5 to about 75, most preferably from about 5 to about 50 wt % (based on the combined weight of the first and second components of the bicomponent fiber).

The shape memory composition used to prepare the structures and fabricated articles of the present invention having shape memory properties can also comprise from 0 to about 80, preferably from 0 to about 50, more preferably from 0 to about 20% by weight (based on the final weight of the polymer or polymer blend) of one or more fillers, comprising talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres or chalk. Of these fillers, talc, calcium carbonate, carbon black and titanium dioxide, and mixtures thereof are preferred.

The most preferred inorganic fillers are, calcium carbonate, carbon black and titanium dioxide or mixtures thereof.

The interpolymer or blend used to prepare the molded structures and fabricated articles of the present invention having shape memory properties should have a Glass Transition Temperature (Tg) of about —40° C. to about 50° C., preferably from about 18° C. to about 50° C. Tg, more preferably from about 23° C. to about 45° C. as this range would cover all applications which are used in the ambient temperature range. The interpolymer of most interest will have a very sharp Tg (at whichever temperature) plus demonstrate a dramatic change in modulus as Tg is reached.

The Tg of the interpolymer or blend used to prepare the molded structures and fabricated articles of the present invention having shape memory properties can be controlled by variation in both the monomer composition of the substantially random interpolymer and its overall molecular weight. Thus increasing the styrene content and molecular weight of the ethylene/styrene interpolymers can be used to further increase their Tg (in addition to the aforementioned use of tackifiers).

This invention could be a heat insulator made of shape memory polymer foam or molded part which has good moldability and changes greatly in elastic modulus above and below its glass transition point. Further, this invention could be a fibrous sheet having the shape memory property which comprises a sheet made of natural fiber and/or synthetic fiber and a layer formed by applying a powder of shape memory polymer; and a method of imparting the shape memory property which comprises applying a powder of shape memory polymer to a desired part of a product of a sheet made of natural fiber and/or synthetic fiber by the aid of a resin adhesive.

The product of the present invention can be used for any article which could be shaped for more efficient transportation and reshaped using the process of the present invention by the end user. Also included are toys, cushioning devices such as pillows and mattresses which would conform to the body shape, bonding materials for singular pipes, internal laminating materials of pipes, housewares such as trash bins, lids, and containers, grips, handles, sporting goods hooks, shower mats lining materials, clamping pins, medical instrument materials such as stationery and educational materials, artificial flower, doll, internal laminates of rolls of dot printer for computer, sound-proofing materials, members requiring deformation restoration after impact absorption such as automobile bumpers, automotive seats, armrests and pillars, gap preventing materials of partitioning members for house, portable vessel which is folded during nonuse and restored in shape during use, mechanical device such as coupling, etc., various heat shrinkable tubes, etc.

Further uses include softening conduit for carrying fluids into and out of the human body, dynamic polymer composites, a catheter balloon with retraction coating, an endoscopic surgical retractor, a deformable endoscopic surgical retractor, protective equipment, emergency limb stabilizing devices, a specimen reduction device, a closing plug of a defect for medical use, makeup material for human use, woven and non-woven fabric made of shape memory polymer, heat insulators made of shape memory polymer foam, amorphous reshape polymer alignment device with access means, shape memory polymer foam, reshape polymer multiple cavity fiber splicer, reshape polymer optical fiber splicer and methods, and the like.

The shape memory fibers of the present invention could also have applications such as carpet fibers, elastic fibers, doll hair, personal/feminine hygiene applications, diapers, athletic sportswear, wrinkle free and form-fitting apparel, conductive fibers, upholstery, and medical applications including, but not restricted to, bandages, gamma sterilizable non-woven fibers, woven fabric made of shape memory polymer, shape memory fibrous sheet and method of imparting shape memory property to fibrous sheet product.

The following examples are illustrative of the invention, but are not to be construed as to limiting the scope thereof in any manner.

EXAMPLES

Test Methods a) Melt Flow and Density Measurements

The molecular weight of the polymer compositions for use in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, cm$^3$/10 min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8% to 81.8% by weight styrene. Atactic polystyrene levels in these samples was typically 10% or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the $I_2$ weight was in force. The weight and time for each melt strand was recorded and normalized to yield the mass in grams per 10 minutes. The instrument's calculated $I_2$ melt index value was also recorded. The equation used to calculate the actual melt density is $$\delta = \delta_{0.7632} \times I_2/I_2 \text{ Gottfert}$$

where $\delta_{0.7632} = 0.7632$ and $I_2$ Gottfert=displayed melt index.

A linear least squares fit of calculated melt density versus total styrene content leads to an equation with a correlation coefficient of 0.91 for the following equation:

$$\delta = 0.00299 \times S + 0.723$$

where S=weight percentage of styrene in the polymer. The relationship of total styrene to melt density can be used to determine an actual melt index value, using these equations if the styrene content is known.

So for a polymer that is 73% total styrene content with a measured melt flow (the "Gottfert number"), the calculation becomes:

$$x = 0.00299 * 73 + 0.723 = 0.9412$$

where $$0.9412/0.7632 = I_2/G\#(\text{measured}) = 1.23$$

The density of the substantially random interpolymers used in the present invention was determined in accordance with ASTM D-792.

b) Styrene Analyses

Interpolymer styrene content and atactic polystyrene concentration were determined using proton nuclear magnetic resonance ($^1$H N.M.R). All proton NMR samples were prepared in 1,1,2,2-tetrachloroethane-d$_2$ (TCE-d$_2$). The resulting solutions were 1.6–3.2 percent polymer by weight. Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-d$_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-d$_2$ at 5.99 ppm. The delay times were varied between 1 second, and data was collected in triplicate on each sample. The following instrumental conditions were used for analysis of the interpolymer samples:

Varian VXR-300, standard $^1$H:

Sweep Width, 5000 Hz

Acquisition Time, 3.002 sec

Pulse Width, 8 µsec

Frequency, 300 MHz

Delay, 1 sec

Transients, 16

The total analysis time per sample was about 10 minutes.

Initially, a $^1$H NMR spectrum for a sample of the polystyrene, Styron™ 680 (available form the Dow Chemical Company, Midland, Mich.) was acquired with a delay time of one second. The protons were "labeled": b, branch; a, alpha; o, ortho; m, meta; p, para, as shown in Formula 1.

Formula 1

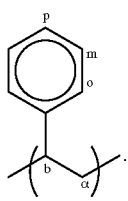

Integrals were measured around the protons labeled in Formula 1; the 'A' designates aPS. Integral $A_{7.1}$(aromatic, around 7.1 ppm) is believed to be the three ortho/para protons; and integral $A_{6.6}$ (aromatic, around 6.6 ppm) the two meta protons. The two aliphatic protons labeled a resonate at 1.5 ppm; and the single proton labeled b is at 1.9 ppm. The aliphatic region was integrated from about 0.8 to 2.5 ppm and is referred to as $Aa_l$. The theoretical ratio for $A_{7.1}: A_{6.6}: A_{al}$ is 3:2:3, or 1.5:1:1.5, and correlated very well with the observed ratios for the Styron™ 680 sample for several delay times of 1 second. The ratio calculations used to check the integration and verify peak assignments were performed by dividing the appropriate integral by the integral $A_{6.6}$. Ratio $A_r$ is $A_{7.1}/A_{6.6}$.

Region $A_{6.6}$ was assigned the value of 1. Ratio Al is integral $A_{al}/A_{6.6}$. All spectra collected have the expected 1.5:1:1.5 integration ratio of (o+p): m; (a+b). The ratio of aromatic to aliphatic protons is 5 to 3. An aliphatic ratio of 2 to 1 is predicted based on the protons labeled α and b respectively in Formula 1. This ratio was also observed when the two aliphatic peaks were integrated separately.

For the ethylene/styrene interpolymers, the $^1$H NMR spectra using a delay time of one second, had integrals $C_{7.1}$, $C_{6.6}$, and $C_{al}$ defined, such that the integration of the peak at 7.1 ppm included all the aromatic protons of the copolymer as well as the o & p protons of aPS. Likewise, integration of the aliphatic region $C_{al}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample Styron™ 680.) This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

(C Phenyl)=$C_{7.1}+A_{7.1}-(1.5 \times A_{6.6})$ (C Aliphatic)=$C_{al}-(1.5 \times A_{6.6})$ $s_c$=(C Phenyl)/5

$e_c$=(C Aliphatic$-(3 \times s_c))/4$ $E=e_c/(e_c+s_c)$ $S_c=s_c/(e_c+s_c)$ and the following equations were used to calculate the mol % ethylene and styrene in the interpolymers.

$$Wt \%E = \frac{E*28}{(E*28)+(S_c*104)}(100)$$

and $$Wt \%S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$Wt \% aPS = \frac{(Wt \%S)*\left(\frac{\frac{A_{6.6}}{2}}{s_c}\right)}{100+\left[(Wt \%S)*\left(\frac{\frac{A_{6.6}}{2}}{s_c}\right)\right]}*100$$

The total styrene content was also determined by quantitative Fourier Transform Infrared spectroscopy (FTIR).

Test parts and characterization data for the interpolymers and their blends are generated according to the following procedures:

Compression Molding

Samples are melted at 190° C. for 3 minutes and compression molded at 190° C. under 20,000 lb (9,072 kg) of pressure for another 2 minutes. Subsequently, the molten materials are quenched in a press equilibrated at room temperature.

Injection Molding

Samples were injection molded on a 150 ton deMag injection molding machine at 190 C. melt temperature, 1 second injection time, 70 F. water temperature, and 60 second overall cycle time. The mold was an ASTM test mold which includes 0.5 inch by 5 inch by 75 mil thick ASTM flexural modulus test specimens.

Differential Scanning Calorimetry (DSC)

A Dupont DSC-2920 is used to measure the thermal transition temperatures and heat of transition for the interpolymers. In order to eliminate previous thermal history, samples are first heated to 200° C. Heating and cooling curves are recorded at 1I0C/min. Melting (from second heat) and crystallization temperatures are recorded from the peak temperatures of the endotherm and exotherm, respectively.

Preparation of ESI Interpolymers Used in Examples and Comparative Experiments of Present Invention 1) Preparation of ESI #'s 1–6

The interpolymers were prepared in a 400 gallon agitated semi-continuous batch reactor. The reaction mixture consisted of approximately 250 gallons a solvent comprising a mixture of cyclohexane (85 wt %) and isopentane (15 wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components Titanium: (N-1,1-dimethylethyl)dimethyl(1-(1,2,3,4,5-eta)-2,3, 4,5-tetramethyl-2,4-cyclopentadien-1-yl)silanaminato))(2-)N)-dimethyl, CAS# 135072-62-7 and Tris(pentafluorophenyl)boron, CAS# 001109-15-5, Modified methylaluminoxane Type 3A, CAS# 146905-79-5 are flow controlled, on a mole ratio basis of 1/3/5 respectively, combined and added to the vessel.

After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™ 1010 anti-oxidant is then added to the solution and the polymer is isolated from the solution. The resulting polymers are isolated from solution by either stripping with steam in a vessel or by use of a devolatilizing extruder. In the case of the steam stripped material, additional processing is required in extruder like equipment to reduce residual moisture and any unreacted styrene. The specific preparation conditions for each interpolymer are summarized in Table 1 and their properties in Table 2.

TABLE 1

Preparation Conditions for ESI #'s 1–6

| ESI # | Solvent loaded lbs | Solvent loaded kg | Styrene loaded lbs | Styrene loaded kg | Pressure Psig | Pressure kPa | Temp. °C. | Total $H_2$ Added Grams | Run Time Hrs |
|---|---|---|---|---|---|---|---|---|---|
| ESI 1 | 252 | 114 | 1320 | 599 | 40 | 276 | 60 | 23 | 6.5 |
| ESI 2 | 842 | 381 | 662 | 300 | 105 | 724 | 60 | 8.8 | 3.7 |
| ESI 3 | 840 | 380 | 661 | 299 | 105 | 724 | 60 | 36.5 | 5.0 |
| ESI 4 | 839 | 380 | 661 | 299 | 105 | 724 | 60 | 53.1 | 4.8 |
| ESI 5 | 1196 | 541 | 225 | 102 | 70 | 483 | 60 | 7.5 | 6.1 |
| ESI 6 | 1196 | 541 | 225 | 102 | 70 | 483 | 60 | 81.1 | 4.8 |

TABLE 2

Properties of ESI #'s 1–6

| ESI # | ESI Styrene (wt %) | ESI Styrene (mol %) | Atactic Polystyrene (wt %) | Melt Index, $I_2$ (g/10 m) | $10^{-3} M_w$ | $M_w/M_n$ Ratio | Tg (°C.) | Tensile Modulus (KPSI) | Flex Modulus (KPSI) |
|---|---|---|---|---|---|---|---|---|---|
| ESI 1 | 72.7 | 41.8 | 7.8 | 1.83 | 187 | 2.63 | 24.7 | 102 | 90 |
| ESI 2 | 45.0 | 18.6 | 4.0 | 0.01 | 327 | 2.26 | -12.7 | 1 | 20 |
| ESI 3 | 45.7 | 18.5 | N/A | 0.72 | N/A | N/A | N/A | N/A | N/A |
| ESI 4 | 43.4 | 17.1 | 10.3 | 2.62 | 126 | 1.89 | -4.4 | 1 | 10 |
| ESI 5 | 27.3 | 9.2 | 1.2 | 0.03 | 241 | 2.04 | -17.2 | 3 | 9 |
| ESI 6 | 32.5 | 11.5 | 7.8 | 10.26 | 83 | 1.87 | -15.8 | 3 | 6 |

1) Preparation of ESI #'s 7–25

ESI #'s 7–25 are substantially random ethylene/styrene interpolymers prepared using the following catalyst and polymerization procedures.

Preparation of Catalyst A (dimethyl[N-(1,1-dimethylethyl)-1-dimethyl-1-[(1 2,3,4,5-η)-1,5,6,7-tetrahydro-3-phenyl-s-indacen-1-yl]silanaminato(2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR (CDCl$_3$): d2.04–2.19 (m, 2H), 2.65 (t, $^3J_{HH}$=5.7 Hz, 2H), 2.84–3.0 (m, 4 H), 3.03 (t, $^3J_{HH}$=5.5 Hz, 2H), 7.26 (s, 1H), 7.53 (s, 1H). $^{13}$C NMR (CDCl$_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$(2×100 mL) and then dried over $MgSO_4$. Filtration followed by the removal of the volatiles resulted in the isolation of the desired product as a dark oil (14.68 g, 90.3% yield).

$^1$H NMR (CDCl$_3$): d2.0–2.2 (m, 2H), 2.8–3.1 (m, 4H), 6.54 (s, 1H), 7.2–7.6 (m, 7H). GC-MS: Calculated for $C_{18}H_{16}$ 232.13, found 232.05.

3) Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane.

1,2,3,5-Tetrahydro-7-phenyl-s-indacene, dilithium salt (12.2075 g, 0.05102 moles) in THF (50 mL) was added dropwise to a solution of Me$_2$SiCl$_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

$^1$H NMR (CDCl$_3$): d0.33 (s, 3H), 0.38 (s, 3H), 2.20 (p, $^3J_{HH}$=7.5 Hz, 2H), 2.9–3.1 (m, 4H), 3.84 (s, 1H), 6.69 (d, $^3J_{HH}$=2.8 Hz, 1H), 7.3–7.6 (m, 7H), 7.68 (d, $^3J_{HH}$=7.4 Hz, 2H). $^{13}$C NMR (CDCl$_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for C$_{20}$H$_{21}$ClSl 324.11, found 324.05.

5) Preparation of N-(1,1-Dimethylethyl)-1,1-dimethyl-1,1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as NEt$_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

$^1$H NMR (CDCl$_3$): d0.02 (s, 3H), 0.04 (s, 3H), 1.27 (s, 9H), 2.16 (p, $^3J_{HH}$=7.2 Hz, 2H), 2.9–3.0 (m, 4H), 3.68 (s, 1H), 6.69 (s, 1H), 7.3–7.5 (m, 4H), 7.63 (d, $^3J_{HH}$=7.4 Hz, 2H). $^{13}$C NMR (CDCl$_3$): d−0.32, −0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane) was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of TiCl$_3$(THF)$_3$ (4.5005 g, 0.01214 moles) in THF (100 mL). This mixture was allowed to stir for 2 hours. PbCl$_2$ (1.7136 g, 0.006162 moles) was then added and the mixture allowed to stir for an additional hour. After the reaction period the volatiles were removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

$^1$H NMR (CDCl$_3$): d0.71 (s, 3H), 0.97 (s, 3H), 1.37 (s, 9H), 2.0–2.2 (m, 2H), 2.9–3.2 (m, 4H), 6.62 (s, 1H), 7.35–7.45 (m, 1H), 7.50 (t, $^3J_{HH}$=7.8 Hz, 2H), 7.57 (s, 1H), 7.70 (d, $^3J_{HH}$=7.1 Hz, 2H), 7.78 (s, 1H).

$^1$H NMR (C$_6$D$_6$): d0.44 (s, 3H), 0.68 (s, 3H), 1.35 (s, 9H), 1.6–1.9 (m, 2H), 2.5–3.9 (m, 4H), 6.65 (s, 1H), 7.1–7.2 (m, 1H), 7.24 (t, $^3J_{HH}$=7.1 Hz, 2H), 7.61 (s, 1H), 7.69 (s, 1H), 7.77–7.8 (m, 2H). $^{13}$C NMR (CDCl$_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93. $^{13}$C NMR (C$_6$D$_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-1)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR (C$_6$D$_6$): d0.071 (s, 3H), 0.49 (s, 3H), 0.70 (s, 3H), 0.73 (s, 3H), 1.49 (s, 9H), 1.7–1.8 (m, 2H), 2.5–2.8 (m, 4H), 6.41 (s, 1H), 7.29 (t, $^3J_{HH}$=7.4 Hz, 2H), 7.48 (s, 1H), 7.72 (d, $^3J_{HH}$=7.4 Hz, 2H), 7.92 (s, 1H). $^{13}$C NMR (C$_6$D$_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of bis(hydrogenated-tallowalkyl)methylamine Cocatalyst

Methylcyclohexane (1200 mL) was placed in a 2 L cylindrical flask. While stirring, 104 g, ground to a granular form of bis(hydrogenated-tallowalkyl)methylamine (ARMEEN® M2HT available from Akzo Chemical,) was added to the flask and stirred until completely dissolved. Aqueous HCl (1M, 200 mL) was added to the flask, and the mixture was stirred for 30 minutes. A white precipitate formed immediately. At the end of this time, LiB(C$_6$F$_5$)$_4$·Et$_2$O ·3 LiCl (Mw=887.3; 177.4 g) was added to the flask. The solution began to turn milky white. The flask was equipped with a 6" Vigreux column topped with a distillation apparatus and the mixture was heated (140° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with H$_2$O and the aqueous layers again discarded. The H$_2$O saturated methylcyclohexane solutions were measured to contain 0.48 wt percent diethyl ether (Et$_2$O).

The solution (600 mL) was transferred into a 1 L flask, sparged thoroughly with nitrogen, and transferred into the drybox. The solution was passed through a column (1" diameter, 6" height) containing 13X molecular sieves. This reduced the level of Et$_2$O from 0.48 wt percent to 0.28 wt percent. The material was then stirred over fresh 13X sieves (20 g) for four hours. The Et$_2$O level was then measured to be 0.19 wt percent. The mixture was then stirred overnight, resulting in a further reduction in Et$_2$O level to approximately 40 ppm. The mixture was filtered using a funnel equipped with a glass frit having a pore size of 10–15 gm to give a clear solution (the molecular sieves were rinsed with additional dry methylcyclohexane). The concentration was measured by gravimetric analysis yielding a value of 16.7 wt percent.

Polymerization

ESI #'s 7–25 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (I lb/hr (0.45 kg/hr)) and the reactor agitator (0.75 lb/hr (0.34 kg/ hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to −250 mm of pressure absolute at the reactor pressure control valve. This flashed polymer entered a hot oil jacketed devolatilizer. Approximately 85 percent of the volatiles were removed from the polymer in the devolatilizer. The volatiles exited the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The various catalysts, co-catalysts and process conditions used to prepare the various individual ethylene styrene interpolymers (ESI #'s 7–25) are summarized in Table 3 and their properties are summarized in Table 4.

TABLE 3

Preparation Conditions for ESI #'s 7–25

| ESI # | Reactor Temp ° C. | Solvent Flow lb/hr | Ethylene Flow lb/hr | Hydrogen Flow sccm | Styrene Flow lb/hr | Ethylene Conversion % | B/Ti Ratio | MMAO$^e$/Ti Ratio | Catalyst | Co-Catalyst |
|---|---|---|---|---|---|---|---|---|---|---|
| ESI 7  | 75.0  | 10.68 | 1.20 | 30.0 | 15.0 | 90.3 | 1.24 | 7.9  | B$^b$ | C$^c$ |
| ESI 8  | 65.7  | 9.16  | 0.79 | 4.5  | 13.0 | 86.7 | 1.25 | 12.1 | B$^b$ | C$^c$ |
| ESI 9  | 72.0  | 26.39 | 1.90 | 24.0 | 20.6 | 77.4 | 3.00 | 10.0 | B$^b$ | D$^d$ |
| ESI 10 | 101.3 | 19.12 | 2.00 | 4.0  | 7.0  | 85.3 | 1.25 | 10.0 | B$^b$ | D$^d$ |
| ESI 11 | 102.3 | 19.21 | 2.00 | 4.0  | 7.0  | 89.6 | 1.25 | 10.0 | B$^b$ | C$^c$ |
| ESI 12 | 89.6  | 30.44 | 2.91 | 21.0 | 8.5  | 92.5 | 1.24 | 10.1 | A$^a$ | C$^c$ |
| ESI 13 | 91.0  | 29.93 | 2.89 | 20.9 | 9.0  | 92.1 | 1.25 | 10.0 | A$^a$ | C$^c$ |
| ESI 14 | 86.9  | 29.76 | 2.49 | 20.1 | 9.0  | 92.7 | 1.24 | 9.9  | A$^a$ | C$^c$ |
| ESI 15 | 80.3  | 18.55 | 1.70 | 12.0 | 12.0 | 87.4 | 1.25 | 10.0 | A$^a$ | C$^c$ |
| ESI 16 | 68.8  | 2.49  | 1.00 | 3.5  | 20.0 | 89.0 | 1.25 | 10.0 | B$^b$ | C$^c$ |
| ESI 17 | 69.2  | 2.98  | 1.00 | 2.7  | 20.0 | 86.3 | 1.25 | 9.9  | B$^b$ | C$^c$ |
| ESI 18 | 69.1  | 2.92  | 1.00 | 2.7  | 20.0 | 88.8 | 1.26 | 10.1 | B$^b$ | C$^c$ |
| ESI 19 | 69.6  | 2.95  | 1.00 | 2.7  | 20.0 | 84.8 | 1.25 | 10.0 | B$^b$ | C$^c$ |
| ESI 20 | 67.7  | 3.03  | 1.01 | 3.5  | 20.0 | 86.4 | 1.25 | 10.0 | B$^b$ | C$^c$ |
| ESI 21 | 67.8  | 2.93  | 1.01 | 50.0 | 20.0 | 89.0 | 1.25 | 10.0 | B$^b$ | C$^c$ |
| ESI 22 | 67.8  | 2.99  | 1.00 | 65.0 | 20.0 | 86.6 | 1.25 | 9.9  | B$^b$ | C$^c$ |

TABLE 3-continued

Preparation Conditions for ESI #'s 7–25

| ESI # | Reactor Temp °C. | Solvent Flow lb/hr | Ethylene Flow lb/hr | Hydrogen Flow sccm | Styrene Flow lb/hr | Ethylene Conversion % | B/Ti Ratio | MMAO[e]/Ti Ratio | Catalyst | Co-Catalyst |
|---|---|---|---|---|---|---|---|---|---|---|
| ESI 23 | 68.0 | 2.52 | 1.00 | 65.0 | 20.0 | 81.3 | 1.25 | 10.0 | B[b] | C[c] |
| ESI 24 | 69.1 | 5.89 | 1.01 | 15.0 | 15.0 | 87.9 | 1.25 | 8.1 | B[b] | C[c] |
| ESI 25 | 67.1 | 2.43 | 1.20 | 0.0 | 23.8 | 90.85 | 1.24 | 10.0 | B[b] | C[c] |

[a]Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]- titanium.
[b]Catalyst B is (t-butylamido)dimethyl(tetramethylcyclopentadienyl)silane-titanium (II) 1,3-pentadiene prepared as described in U.S. Pat. No. 5,556,928, Example 17
[c]Cocatalyst C is bis-hydrogenated tallowalkyl methylammonium tetrakis (pentafluorophenyl)borate.
[d]Cocatalyst D is tris(pentafluorophenyl)borane, (CAS# 001109-15-5),
[e]a modified methylaluminoxane commercially available from Akzo Nobel as MMAO-3A (CAS# 146905-79-5)

TABLE 4

Properties of ESI #'s 7–25

| ESI # | ESI Styrene (wt %) | ESI Styrene (mol %) | Atactic Polystyrene (wt %) | Melt Index, $I_2$ (g/10 m) | G # $cm^3/10$ m | $10^3$ $M_w$ | $M_w/M_n$ Ratio | Tg (°C.) |
|---|---|---|---|---|---|---|---|---|
| ESI 7 | 76 | 46 | 3.9 | 12.5 | 12.52 | 138 | 2.40 | 34.8 |
| ESI 8 | 66 | 34 | N/A | 0.7 | N/A | N/A | N/A | 20.5 |
| ESI 9 | 53 | 23 | 12.1 | 10.4 | 10.43 | 116 | 3.38 | 21.1 |
| ESI 10 | N/A | ?? | N/A | N/A | 1.25 | N/A | N/A | N/A |
| ESI 11 | N/A | ?? | N/A | N/A | 1.03 | N/A | N/A | N/A |
| ESI 12 | N/A | ?? | N/A | N/A | 1.02 | N/A | N/A | N/A |
| ESI 13 | N/A | ?? | N/A | N/A | 1.00 | N/A | N/A | N/A |
| ESI 14 | 50 | 21 | N/A | N/A | 1.22 | 147 | 2.54 | −10.0 |
| ESI 15 | 58 | 27 | 3.3 | N/A | 0.98 | 236 | 2.37 | −2.0 |
| ESI 16 | 69 | 37 | N/A | N/A | 1.26 | N/A | N/A | 16.0 |
| ESI 17 | 73 | 42 | N/A | N/A | 1.27 | N/A | N/A | 21.5 |
| ESI 18 | 74 | 43 | N/A | N/A | 1.41 | N/A | N/A | 22 |
| ESI 19 | 73.3 | 42 | 27.3 | N/A | 1.2 | 230 | 3.35 | 21.0 |
| ESI 20 | 74.3 | 44 | N/A | N/A | 3.0 | N/A | N/A | 21.3 |
| ESI 21 | 71.3 | 40 | N/A | N/A | 14.0 | N/A | N/A | 19.9 |
| ESI 22 | 73.2 | 42 | N/A | N/A | 29.0 | N/A | N/A | 18.0 |
| ESI 23 | 73.3 | 42 | 15.3 | N/A | 43.0 | N/A | N/A | 17.1 |
| ESI 24 | 73.8 | 43 | 44.2 | N/A | 55.0 | 130 | 3.79 | 16.1 |
| ESI 25 | 73.1 | 42 | 15.3 | N/A | 1.8 | 117 | 3.04 | 23.6 |

*N/A = Not Available

Preparation of ESI #'s 26–31

ESI #'s 26–31 were substantially random ethylene/styrene interpolymers prepared using the following catalyst and polymerization procedures.

Preparation of Catalyst A;(1H-cyclopenta[1]phenanthrene-2-yl)dimethyl(t-butylamido)-silanetitanium 1,4-diphenylbutadiene 1) Preparation of lithium 1H-cyclopenta[1]phenanthrene-2-yl To a 250 ml round bottom flask containing 1.42 g (0.00657 mole) of 1H-cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3. Preparation of (1H-cyclopenta[1]phenanthrene-2-yl)dimethyl(t-butylamino)silane To a 500 ml round bottom flask containing 1.98 g (0.0064 mole) of (1H-cyclopenta[1]phenanthrene-2-yl)dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4. Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t- butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5. Preparation of (1H-cyclopenta[1]phenanthrene-2-yl) dimethyl(t-butylamido)silanetitanium dichloride To a 250 ml round bottom flask containing 1.17 g (0.0030 mole) of $TiCl_3.3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6. Preparation of (1H-cyclopenta[1]phenanthrene-2-yl) dimethyl(t-butylamido)silanetitanium 1,4-diphenylbutadiene To a slurry of (1H-cyclopenta[1]phenanthrene-2-yl) dimethyl(t-butylamido)silanetitanium dichloride (3.48 g, 0.0075 mole) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor.

After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Polymerization

ESI #'s 26–31 were prepared in a continuously operating loop reactor (36.8 gal). An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2" diameter line which supplied two Chemineer-Kenics 10-68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. The flow and solution density of the exit stream was measured by a MicroMotion.

Solvent feed to the reactor was supplied by two different sources. A fresh stream of toluene from an 8480-S-E Pulsafeeder diaphragm pump with rates measured by a Micro-Motion flowmeter was used to provide flush flow for the reactor seals (20 lb/hr (9.1 kg/hr). Recycle solvent was mixed with uninhibited styrene monomer on the suction side of five 8480-5-E Pulsafeeder diaphragm pumps in parallel. These five Pulsafeeder pumps supplied solvent and styrene to the reactor at 650 psig (4,583 kPa). Fresh styrene flow was measured by a MicroMotion flowmeter, and total recycle solvent/styrene flow was measured by a separate MicroMotion flowmeter. Ethylene was supplied to the reactor at 687 psig (4,838 kPa). The ethylene stream was measured by a Micro-Motion mass flowmeter. A Brooks flowmeter/controller was used to deliver hydrogen into the ethylene stream at the outlet of the ethylene control valve. The ethylene/hydrogen mixture combined with the solvent/styrene stream at ambient temperature. The temperature of the entire feed stream as it entered the reactor loop was lowered to 2° C. by an exchanger with −10° C. glycol on the jacket.

Preparation of the three catalyst components took place in three separate tanks: fresh solvent and concentrated catalyst/cocatalyst premix were added and mixed into their respective run tanks and fed into the reactor via variable speed 680-S-AEN7 Pulsafeeder diaphragm pumps. As previously explained, the three component catalyst system entered the reactor loop through an injector and static mixer into the suction side of the twin screw pump. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the MicroMotion flowmeter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve. This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a MicroMotion mass flowmeter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure in the second devolatizer was operated at 5 mmHg (0.7 kPa) absolute pressure to flash the remaining solvent. This solvent was condensed in a glycol heat exchanger, pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

The various catalysts, co-catalysts and process conditions used to prepare ESI 26–31 are summarized in Table 5 and their properties are summarized in Table 6.

TABLE 5

Preparation Conditions for ESI #'s 26–31[a]

| ESI # | Reactor Temp °C. | Solvent Flow lb/hr | Ethylene Flow lb/hr | Hydrogen Flow lb/hr | Styrene Flow lb/hr | Ethylene Conversion % | Co-Catalyst | B/Ti Ratio | MMAO[c]/Ti Ratio |
|---|---|---|---|---|---|---|---|---|---|
| ESI 26 | 76.1 | 415 | 26 | 0 | 153 | 96 | B[b] | 5.3 | 10 |
| ESI 27 | 87 | 445 | 33 | 0.007 | 115 | 93 | D[d] | 6.0 | 15.0 |
| ESI 28 | 95 | 355 | 48 | 0.006 | 50 | 93 | D[d] | 6.0 | 15.0 |
| ESI 29 | 80 | 415 | 26 | 0.024 | 155 | 96 | D[d] | 6.2 | 12.0 |
| ESI 30 | 76 | 415 | 26 | 0 | 152 | 96 | D[d] | 5.5 | 10.0 |
| ESI 31 | 80 | 415 | 26 | 0.002 | 149 | 96 | D[d] | 5.5 | 10.0 |
| ESI 32 | 101 | 478 | 53 | 0.036 | 31 | 95 | D[d] | 4.0 | 6.0 |

[a]Catalyst A is (1H-cyclopenta[1]phenanthrene-2-yl)dimethyl(t-butylamido)-silanetitanium 1,4-diphenylbutadiene.
[b]Cocatalyst B is bis-hydrogenated tallowalkyl methylammonium tetrakis (pentafluorophenyl)borate.
[c]a modified methylaluminoxane commercially available from Akzo Nobel as MMAO-3A (CAS# 146905-79-5)
[d]Cocatalyst D is tris(pentafluorophenyl)borane (CAS# 001109-15-5),.

TABLE 6

Properties of ESI #'s 26–32

| ESI # | ESI Styrene (wt %) | ESI Styrene (mol %) | Atactic Polystyrene (wt %) | Melt Index, $I_2$ (g/10 m) | $10^{-3}$ $M_w$ | $M_w/M_n$ Ratio | Tg (° C.) |
|---|---|---|---|---|---|---|---|
| ESI 26 | 77.6 | 48.8 | 7.8 | 4.34 | 153.3 | 2.7 | 32 |
| ESI 27 | 69.1 | 37.6 | 2.3 | 3.2 | N/A | N/A | N/A |
| ESI 28 | 44.7 | 17.9 | 0.5 | 0.6 | N/A | N/A | N/A |
| ESI 29 | 75.5 | 45.4 | 7.2 | 6.8 | N/A | N/A | N/A |
| ESI 30 | 77.2 | 47.7 | 7.8 | 3.9 | N/A | N/A | N/A |
| ESI 31 | 76.7 | 47.1 | 6.1 | 10.2 | N/A | N/A | N/A |
| ESI 32 | 32.0 | 11.3 | 0.3 | 8.2 | N/A | N/A | N/A |

Dow Styron™ 668

Dow Styron™ 668 is a polystyrene having the trade name of and available from the Dow Chemical Company (Midland, Mich.).

HDPE 42047

HDPE 42047 is a high density polyethylene having a 42.0 melt index ($I_2$) available from the Dow Chemical Company (Midland, Mich.).

f PVC

Flexible PVC (f PVC) is a molding grade flexible PVC having a 90 Shore A hardness having the trade name PolychemsTM CZF-90 and available from Polytrade Chemicals Co. Ltd (China).

Effect of Temperature on the Elastic Modulus of Substantially Random Interpolymers Sample of ESI #'s 1, 7, 8, and 9 were injection molded and their elastic modulus determined as function of temperature using an Instron tensile tester under ASTM Method D-638 at various temperatures. These data are summarized in Table 7

TABLE 7

Elastic Modulus vs Temperature of ESI Samples

| ESI (#) | Styrene (wt %) | Styrene (mol %) | $I_2$ (g/10 min) | Tg (° C.) | Temp (° C.) | $10^{-7}$G' Elastic Modulus (dynes/cm$^2$) |
|---|---|---|---|---|---|---|
| ESI 1 | 73 | 42 | 1.8 | 24.7 | 1.8 | 959.0 |
|  |  |  |  |  | 20.5 | 614.0 |

TABLE 7-continued

Elastic Modulus vs Temperature of ESI Samples

| ESI (#) | Styrene (wt %) | Styrene (mol %) | $I_2$ (g/10 min) | Tg (° C.) | Temp (° C.) | $10^{-7}$G' Elastic Modulus (dynes/cm$^2$) |
|---|---|---|---|---|---|---|
|  |  |  |  |  | 31.1 | 15.7 |
|  |  |  |  |  | 40.8 | 2.6 |
| ESI 7 | 76 | 46 | 12.5 | 34.8 | 0.5 | 982.0 |
|  |  |  |  |  | 20.0 | 28.0 |
|  |  |  |  |  | 29.8 | 18.0 |
|  |  |  |  |  | 39.8 | 3.3 |
| ESI 8 | 66 | 34 | 0.7 | 20.5 | 0.4 | 817.0 |
|  |  |  |  |  | 19.8 | 25.0 |
|  |  |  |  |  | 29.8 | 2.2 |
|  |  |  |  |  | 39.3 | 1.6 |
| ESI 9 | 53 | 23 | 10.4 | 21.1 | -18.5 | 684.0 |
|  |  |  |  |  | 1.6 | 11.8 |
|  |  |  |  |  | 21.6 | 0.5 |

These data demonstrate the rapid change in the modulus as the temperature is increased above the polymer Tg which is a characteristic of shape memory polymers.

Effect of Temperature on the Elongation of Substantially Random Interpolymers

A sample of ESI 1 having a styrene content of 42 mol % (73 wt %) and a melt index ($I_2$) of 1.8 g/10 min was injection molded and its % elongation determined as function of temperature using an Instron tensile tester under ASTM Method D-638. These data are summarized in Table 8.

TABLE 8

Elongation vs Temperature of ESI Samples

| ESI (#) | Styrene (wt %) | Styrene (mol %) | $I_2$ (g/10 min) | Tg (° C.) | Temp (° C.) | Elongation (%) |
|---|---|---|---|---|---|---|
| ESI 1 | 73 | 42 | 1.8 | 24.7 | 23 | 220 |
|  |  |  |  |  | 40 | 585 |

These data demonstrate the rapid increase in % elongation as the temperature is increased above the polymer Tg which is a characteristic of shape memory polymers.

Effect of Styrene Content on the Tg of Substantially Random Ethylene/Styrene Interpolymers The Tg of a series of ESI samples having similar molecular weight (G #~1.0) and varying styrene contents are summarized in Table 9.

TABLE 9

Tg vs Styrene Content of Substantially
Random Ethylene/Styrene Interpolymers

| ESI # | Styrene (wt %) | Styrene (mol %) | Tg (° C.) |
|---|---|---|---|
| ESI 15 | 58 | 27 | −2 |
| ESI 16 | 69 | 37 | 16 |
| ESI 17 | 73 | 42 | 21 |
| ESI 18 | 74 | 43 | 22 |
| ESI* 10/11 | 27 | 9 | −18 |
| ESI* 12/13 | 40 | 15 | −16 |
| ESI 14 | 50 | 21 | −10 |

*a 50/50 wt % blend of the individual interpolymers

These data in Table 9 demonstrate the increase in the polymer Tg as the styrene content of the substantially random ethylene/styrene interpolymers increases.

Effect of Molecular Weight on the Tg of Random Ethylene/Styrene Interpolymers

The Tg of a series of substantially random ethylene/styrene interpolymers having similar styrene content and a molecular weight (as measured by Gottfert melt index) are shown in Table 10.

TABLE 10

Tg vs Gottfert $I_2$ of Substantially
Random Ethylene/Styrene Interpolymers

| ESI # | Styrene (wt %) | Styrene (mol %) | Gottfert $I_2$ (cm$^3$/10 min) | Tg (° C.) |
|---|---|---|---|---|
| ESI 19 | 73.3 | 42 | 1.2 | 21.0 |
| ESI 20 | 74.3 | 44 | 3.0 | 21.3 |
| ESI 21 | 71.3 | 40 | 14.0 | 19.9 |
| ESI 22 | 73.2 | 42 | 29.0 | 18.0 |
| ESI 23 | 73.3 | 42 | 43.0 | 17.1 |
| ESI 24 | 73.8 | 43 | 55.0 | 16.1 |

These data in Table 10 demonstrate the increase in the polymer Tg as the molecular weight of the substantially random ethylene/styrene interpolymers having the desired shape memory property increases.

Effect of Added Tackifiers on the Tg and Modulus of Substantially Random Ethylene/Styrene Interpolymers The tackifiers evaluated in the study, as well as properties obtained from trade literature, are set forth in the following Table 11:

TABLE 11

Summary of Properties of Tackifiers Used in Present Invention

| Tackifier | Manufacturer | Feedstock | Mn | Tg (° C.) |
|---|---|---|---|---|
| Endex 155 | Hercules | Copolymer Modified Styrene | 2,900 | 100 |
| Piccotex 120 | Hercules | Copolymer Modified Styrene | 1,600 | 68 |
| Regalrez 1139 | Hercules | Hydrogenated Styrenic | 1,500 | 80 |
| Kristalex 5140 | Hercules | Copolymer of pure monomer | 1450 | 88 |
| Plastolyn 140 | Hercules | Hydrogenated aliphatic hydrocarbon | 370 | 90 |

A series of blends of ESI 25 having a styrene content of 42 mol % (73 wt %) and a Gottfert melt index of 1.8 g/cm$^3$ were prepared in a Haake torque rheometer with 10 wt % of various tackifiers as summarized in Table 12.

TABLE 12

Effect of 10 wt % of Various Tackifiers on Tg of
ESI #25 (42 mol % styrene, Gottfert = 1.8 g/cm$^3$, Tg = 23.6° C.)

| Tackifier | Tg of Tackifier (° C.) | Tg of Blend (° C.) |
|---|---|---|
| Regalrez ™ 1139 | 80.0 | 23.4 |
| Picotex ™ 120 | 68.0 | 25.0 |
| Kristalex ™ 5140 | 88.0 | 25.2 |
| Plastolyn ™ 140 | 90.0 | 25.6 |
| Endex ™ 155 | 100.0 | 25.7 |

The data in Table 12 demonstrate that the Tg of the substantially random ethylene/styrene interpolymers having the desired shape memory property increases with the addition of the tackifiers used in the present invention.

Shape Memory Property Test on Molded Structures.

1. Injection mold sample and comparative resins on a 150 ton deMag injection molding machine at 190° C. melt temperature, 1 second injection time, 70° F. water temperature, 60 second overall cycle time.
2. Mold should be ASTM test mold which includes 0.5 inch by 5 inch by 75 mil thick ASTM flexural modulus test specimens.
3. Fill a 9×12×2 inch pan with tap water, place on hot plate, heat and maintain water to 120° F. This will be known as the Hot Water Temperature.
4. Fill a second 9×12×2 inch pan with one half tap water and one half ice.

This will maintain 34° F. and be known as the Cold Water Temperature.

5. At ASTM conditions of 71° F. and 50% Relative Humidity, measure the flexural modulus of the injection molded test specimen using an Instron Tensionometer following ASTM D790. Record as Ambient Modulus (AM).
6. Take the same sample and submerge in the ice water for 60 seconds. Remove and quickly test the flexural modulus. Record as Cold Modulus (CM).
7. Take the same sample and place in the Hot Water for 60 seconds. Remove and quickly test the flexural modulus. Record as Hot Modulus (HM).
8. Take the sample after measuring modulus and place back in the hot water for 60 seconds, then remove and bend the specimen by the 5 inch length end to end and pinch the ends together with a clip. Place this in the cold water for 60 seconds.
9. Remove the specimen from the water, remove the clip, and time the sample to see how long is required to return to 80% of its normal, flat shape. Record as Return Time at Ambient.
10. Place the sample back in the hot water for 60 seconds, then remove and bend the specimen by the 5 inch length end to end and pinch the ends together with a clip. Place this in the cold water for 60 seconds.
11. Remove the specimen from the water, remove the clip, and place the sample in the hot water. Time the sample to see how long is required to return to 80% of its normal, flat shape. Record as Return Time at Hot Temperature.

In order to exhibit shape memory behavior the material should:
a) Have a modulus decrease of greater than 80%; and
b) The holding of the new shape for greater than 60 secs at 71° F.; and
c) Have a return time at 120° F. of greater than 10 sec.

EXAMPLE 1

An ESI 29 containing 45.4 mol % styrene (75.5 wt %) and having a melt index ($I_2$) of 6.8 g/10 min was submitted to the shape memory test described herein. The results are summarized in Table 13 and demonstrate the desired modulus decrease of greater than 80% and the holding of the new shape for greater than 60 secs at 71° F., and for 38 sec at 120° F.

EXAMPLE 2

ESI 31 containing 47.1 mol % styrene (76.7 wt %) and having a melt index ($I_2$) of 10.2 g/10 min was submitted to the shape memory test described herein. The results are summarized in Table 13 and demonstrate the desired modulus decrease of greater than 80% and the holding of the new shape for greater than 60 secs at 71° F., and for 36 sec at 120° F.

EXAMPLE 3

ESI 27 containing 37.6 mol % styrene (69.1 wt %) and having a melt index ($I_2$) of 3.2 g/10 min was submitted to the shape memory test described herein. The results are summarized in Table 13 and demonstrate the desired modulus decrease of greater than 80% and the holding of the new shape for greater than 60 secs at 71° F., and for 30 sec at 120° F.

Comparative Experiment 1

ESI 28 containing 17.9 mol % styrene (44.7 wt %) and having a melt index ($I_2$) of 0.6 g/10 min was submitted to the shape memory test described herein. The results are summarized in Table 13 and demonstrate that this sample only exhibits a modulus decrease of 11.09% and only holds the new shape for 10 sec at 71° F., and at 120° F.

Comparative Experiment 2

ESI 32 containing 11.3 mol % styrene (32 wt %) and having a melt index ($I_2$) of 8.2 g/10 min was submitted to the shape memory test described herein. The results are summarized in Table 13 and demonstrate that this sample only exhibits a modulus decrease of 39.02% and only holds the new shape for 10 sec at 71° F., and at 120° F.

Comparative Experiment 3

A sample of Dow Styron™ 668 was submitted to the shape memory test described herein. The results are summarized in Table 13 and demonstrate that this sample only exhibits a modulus decrease of 8.06% and was too brittle to hold a new shape at both 71° F., and at 120° F.

Comparative Experiment 4

A sample of Dow HDPE 40047 was submitted to the shape memory test described herein. The results are summarized in Table 13 and demonstrate that this sample exhibits a modulus decrease of 59.80% and only holds the new shape for 10 sec at 71° F., and at 120° F.

Comparative Experiment 5

A sample of flexible PVC having a Shore A Hardness of 90 was submitted to the shape memory test described herein. The results are summarized in Table 13 and demonstrate that this sample exhibits a modulus decrease of 91.90% and only holds the new shape for 10 sec at 71° F., and at 120° F.

TABLE 13

Results of Shape/Reshape Test on Molded Structures

| Example # | Sample # | Styrene (wt %) | Styrene (mol %) | Melt Index ($I_2$) (g/10 min) | 71° F. Modulus (AM, psi) | 34° F. Modulus (CM, psi) | 120° F. Modulus, (HM, psi) | Modulus Decrease[a] (%) | Return Time, 71° F. (sec) | Return Time, 120° F. (sec) |
|---|---|---|---|---|---|---|---|---|---|---|
| Example 1 | ESI # 29 | 75.5 | 45.4 | 6.8 | 374,665 | 425,798 | 3164 | 99.26 | no return* | 38 |
| Example 2 | ESI # 31 | 76.7 | 47.1 | 10.2 | 379,149 | 433,944 | 2081 | 99.52 | no return* | 36 |
| Example 3 | ESI # 27 | 69.1 | 37.6 | 3.2 | 2121 | 137,400 | 2307 | 98.32 | no return* | 30 |
| Comparative Expt. 1 | ESI # 28 | 44.7 | 17.9 | 0.6 | 2158 | 2154 | 1915 | 11.09 | 10 | 10 |
| Comparative Expt. 2 | ESI # 32 | 32.0 | 11.3 | 8.2 | 6973 | 8280 | 5049 | 39.02 | 10 | 10 |
| Comparative Expt. 3 | GPS Dow Styron 668 | N/A | N/A | N/A | 485,245 | 479,044 | 440,439 | 8.06 | sample broke | sample broke |
| Comparative Expt. 4 | HDPE Dow 42047 | N/A | N/A | 42.0 | 75,100 | 113,454 | 45604 | 59.80 | 10 | 10 |
| Comparative Expt. 5 | f-PVC, (90 shore A) | N/A | N/A | N/A | 16703 | 54987 | 4455 | 91.90 | 10 | 10 |

[a]Modulus decrease = (CM-HM)/CM × 100
*for greater than 60 secs.

The data in Table 13 demonstrate that;
1) ESI with 37.6 mol % (69.1 wt %) or greater incorporated styrene shows a dramatic change in modulus when tested at 71° F., 120° F., and 34° F. In contrast, PS and PE do not.
2) ESI with 37.6 mol % (69.1wt %) or greater incorporated styrene, once taken to 120° F., can be readily shaped into a new form. If the object is then subjected to initially subjected to 34° F. and then allowed to warm up, it will take and hold that new shape for greater than 60 secs at 71° F., and for greater than 10 secs at 120° F. In contrast, PS and PE cannot.
3) ESI with less than 37.6 mol % (69.1 wt %) incorporated styrene acts like polyethylene in terms of its return time.
4) Flexible PVC shows modulus temperature sensitivity, but not shape/reshape behavior.

EXAMPLES 4–9

The fiber of Example 4 was prepared from ESI 26, the fiber of Examples 5–6 were prepared from ESI 33, the fiber of Example 7 was prepared from ESI 25, the fiber of Example 8 was prepared from ESI 34, and the fiber of Example 9 was prepared from ESI 35 all of which were prepared using the polymerization procedure used for ESI 7. The process conditions and catalysts used for ESI 33–35 are summarized in Table 14 and having the compositions and properties summarized in Table 15.

between the percent permanent set and 100% is known as the percent elastic recovery. Thus, a fiber having a permanent set of 10% will have a 90% elastic recovery. After recording percent permanent set, the fiber is pulled to 100% strain and the tenacity recorded. The fiber pulling process is repeated several times, with the percent permanent set recorded each time and the 100% strain tenacity recorded as

TABLE 14

Preparation Conditions for ESI #'s 33–35[a]

| ESI # | Reactor Temp °C. | Solvent Flow lb/hr | Ethylene Flow lb/hr | Hydrogen Flow sccm | Styrene Flow lb/hr | Ethylene Conversion % | B/Ti Ratio | MMAO[e]/Ti Ratio | Catalyst | Co-Catalyst |
|---|---|---|---|---|---|---|---|---|---|---|
| ESI 33 | 64.3 | 35.05 | 1.30 | 4.5 | 18.0 | 92.9 | 3.00 | 5.0 | F[f] | D[d] |
| ESI 34 | 69.6 | 2.95 | 1.00 | 2.7 | 20.0 | 84.8 | 1.25 | 10.0 | B[b] | C[c] |
| ESI 35 | 71.1 | 15.84 | 1.19 | 2.6 | 18.0 | 85.9 | 1.24 | 12.0 | A[a] | C[c] |

[a]Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]- titanium.
[b]Catalyst B is (t-butylamido)dimethyl(tetramethylcyclopentadienyl)silane-titanium (II) 1,3-pentadiene prepared as described in U.S. Pat. No. 5,556,928, Example 17
[c]Cocatalyst C is bis-hydrogenated tallowalkyl methylammonium tetrakis (pentafluorophenyl)borate.
[d]Cocatalyst D is tris(pentafluorophenyl)borane, (CAS# 001109-15-5),.
[e]a modified methylaluminoxane commercially available from Akzo Nobel as MMAO-3A (CAS# 146905-79-5)
[f]Catalyst F is (1H-cyclopenta[1]phenanthrene-2-yl)dimethyl(t-butylamido)-silanetitanium 1,4-diphenylbutadiene.

Fiber Preparation

The polymers were extruded using a one inch diameter extruder which feeds a gear pump. The gear pump pushes the material through a spin pack containing a 40 micrometer (average pore size) sintered flat metal filter and a 34 or 108 hole spinneret.

The spinneret holes have a diameter of 400 or 800 micrometers both having a land length (i.e, length/diameter or L/D) of 4/1. The gear pump is operated such that about 0.39 grams of polymer are extruded through each hole of the spinneret per minute. The melt temperature of the polymer is typically from about 200–240° C., and varies depending upon the molecular weight and styrene content of the interpolymer being spun. Generally the higher the molecular weight, the higher the melt temperature. Quench air (about 25° C.) is used to help the melt spun fibers cool. The quench air is located just below the spinneret and blows air across the fiber line as it is extruded. The quench air flow rate is low enough so that it can barely be felt by hand in the fiber area below the spinneret. The fibers are collected on a godet roll located about 3 meters below the spinneret die and having a diameter of about 6 inches (15.24 cm). The godet roll speed is adjustable, but for the experiments demonstrated herein, the godet speed ranged from about 200–3100 revolutions/minute.

Fibers were tested on an Instron tensile testing device equipped with a small plastic jaw on the cross-head (the jaw has a weight of about six gms) and a 500 gram load cell. The jaws are set 1 inch (2.54 cm) apart. The cross head speed is set at 5 inches/minute (12.7 cm/minute). A single fiber is loaded into the Instron jaws for testing. The fiber is then stretched to 100% of strain (i.e., it is stretched another 1 inch), where the tenacity is recorded. The fiber is allowed to return to the original Instron setting (where the jaws are again 1 inch apart) and the fiber is again pulled. At the point where the fiber begins to provide stress resistance, the strain is recorded and the percent permanent set is calculated. Thus, a fiber pulled for the second time which did not provide stress resistance (i.e., pull a load) until it had traveled 0.1 inches (0.25 cm) would have a percent permanent set is of 10%, i.e., the percent of strain at which the fiber begins to provide stress resistance. The numerical difference well. Finally, the fiber is pulled to its breaking point and the ultimate breaking tenacity and elongation recorded.

Shape-Reshape Fibers Test

A tuft of 2 mil diameter fibers is tightly wrapped around a circular rod of 5/16" diameter, and tightly held within the hand for 30 sec, to bring the fibers to body temperature (98.6° F.). The heat source (hand) is removed for ten seconds and then the rod is removed from the coiled fibers.

An acceptable shape-reshape fiber should hold at least a loose wavy curl for greater than 30 seconds when tested at an ambient room temperature of 25° C. If the Tg of the resin used to produce the fibers is significantly above ambient temperature, then the fibers will exhibit a very tight curl which holds for >30 seconds (see Example 4, Table 15). If the Tg range overlaps the ambient temperature range, then the fiber curl will resemble a loosely wound spring (see Example 5, Table 15).

Combing of the curled fibers provides mechanical or frictional heat to straighten the fibers and the sequence can be repeated numerous times.

The Tg of the ESI can be increased by addition of a suitable tackifier as shown in Example 6. This improved the curl performance, but not as much as observed in a neat ESI sample of equivalent Tg. This is believed to be due to the fact that the neat ESI has a narrower Tg range than a formulation containing ESI blended with tackifier resin.

Table 15 illustrates the results of the above fiber shape memory test when conducted using fibers prepared from the various ESI interpolymers. The acrylic and polyvinylidene chloride resins are examples of materials currently in commercial use for producing fibers for doll hair which do not pass this shape memory test.

TABLE 15

Results of Shape/Reshape Test on Fibers

| Example # | Type | I$_2$ (g/10 min) | Styrene (mol %) | Styrene (wt %) | ESI Tg (° C.) | Curl Hold Time | Shape-Reshape Curl Rating |
|---|---|---|---|---|---|---|---|
| 4 | ESI 26 | 4.3 | 48.8 | 77.6 | 32 | >5 Min | Excellent (Tight curl) |
| 5 | ESI 33 | 1.0 | 45.3 | 75.5 | 28 | >30 sec | Marginal (wavy curl) |
| 6 | ESI 33/ Tackifier* | 1.0 | 45.3 | 75.5 | 28 (33)$^+$ | >30 sec | Good (Loose curl) |
| 7 | ESI 25 | 1.0 | 44.0 | 74.5 | 25 | <30 sec | Poor (No curl) |
| 8 | ESI 34 | 1.0 | 42.1 | 73.0 | 21 | <5 sec | Very Poor (No curl) |
| 9 | ESI 35 | 4.0 | 40.9 | 72.0 | 17 | <5 sec | Very Poor (No curl) |

*Endex 155 Tackifier resin from Hercules at 20 wt %
$^+$Blend Tg in parentheses.

EXAMPLES 10–16

Fibers of Examples 10–16 were prepared from ESI #'s 36–37 prepared using the polymerization procedure used for ESI 7 using the process conditions and catalysts summarized in Table 16.

TABLE 16

Preparation Conditions for ESI #'s 36–37$^a$

| ESI # | Reactor Temp ° C. | Solvent Flow lb/hr | Ethylene Flow lb/hr | Hydrogen Flow sccm | Styrene Flow lb/hr | Ethylene Conversion % | B/Ti Ratio | MMAO$^e$/Ti Ratio | Catalyst | Co-Catalyst |
|---|---|---|---|---|---|---|---|---|---|---|
| ESI 36 | 62.4 | 48.12 | 1.79 | 32.0 | 24.8 | 86.5 | 3.00 | 8.0 | F$^f$ | D$^d$ |
| ESI 37 | 63.3 | 30.0 | 1.30 | 5.7 | 15.0 | 97.2 | 5.00 | 10.0 | F$^f$ | D$^d$ |

$^d$Cocatalyst D is tris(pentafluorophenyl)borane, (CAS# 001109-15-5),.
$^e$a modified methylaluminoxane commercially available from Akzo Nobel as MMAO-3A (CAS# 146905-79-5)
$^f$Catalyst F is (1H-cyclopenta[1]phenanthrene-2-yl)dimethyl(t-butylamido)-silanetitanium 1,4-diphenylbutadiene.

Fibers were prepared for Examples 10–16 from the formulations as summarized in Table 17. The fibers were produced from these formulations under the following conditions:

| | |
|---|---|
| Temperature set points: | 160° C./230° C./250° C./250° C./250° C. |
| Gear Pump Settings: | 10 rpm and 2 lb/hr throughput |
| Quench: | Off |
| Haul Off | 700 rpm at 1.5–2.0 mil |

The presence of additives in the formulations caused the haul off maximum speeds to decrease by at least 300 rpm. In other words to make a sample containing additives at 700 rpm haul off would require that the base resin be able to sustain a 1000 rpm haul off rate.

The Tg values for the formulations are also summarized in Table 17.

TABLE 17

Results of Fiber Tests
Effect of Added Tackifiers and a Second Blend Component on the Tg of Substantially Random Ethylene/Styrene Interpolymers Having the Shape Memory Property.

| Example # | ESI (#) | Styrene (wt %) | Styrene (mol %) | aPS (wt %) | G# (ml/10 min) | Additives (wt %) | Tg, (DSC) (° C.) |
|---|---|---|---|---|---|---|---|
| Ex. 10 | ESI 36 | 74.2 | 43.6 | 5 | 9.0 | None | 23.68 |
| Ex. 11 | ESI 36 | 74.2 | 43.6 | 5 | 9.0 | Acrylic (10%) | 27.47 |
| Ex. 12 | ESI 36 | 74.2 | 43.6 | 5 | 9.0 | Tackifier* (20%) Tackifier* (30%) | 34.71 |
| Ex. 13 | ESI 36 | 74.2 | 43.6 | 5 | 9.0 | Acrylic (10%) | 35.40 |

TABLE 17-continued

Results of Fiber Tests
Effect of Added Tackifiers and a Second Blend Component on the Tg of Substantially
Random Ethylene/Styrene Interpolymers Having the Shape Memory Property.

| Example # | ESI (#) | Styrene (wt %) | Styrene (mol %) | aPS (wt %) | G# (ml/10 min) | Additives (wt %) | Tg, (DSC) (° C.) |
|---|---|---|---|---|---|---|---|
| Ex. 14 | ESI 37 | 75.0 | 44.7 | N/A | 2.3 | Tackifier* (30%) None | 28.67 |
| Ex. 15 | ESI 37 | 73.8 | 44.7 | N/A | 2.3 | Acrylic (10%) Tackifier* (10%) | 30.93 |
| Ex. 16 | ESI 37 | 73.2 | 44.7 | N/A | 2.3 | Acrylic (10%) Tackifier* (20%) | 32.60 |

*Endex ™ 155 tackifier

EXAMPLES 17–21

Examples 17–21 are fibers prepared as for Example 10 from a blend of ESI 25 having a styrene content of 42 mol % (73 wt %) and a Gottfert melt index of 1.8 g/cm³ with Endex TM 155 tackifier and/or acrylic in the relative proportions summarized in Table 18.

TABLE 18

Effect of Endex ™ 155 and Acrylic on the Tg of Blends With
ESI #25 (42 mol % styrene, Gottfert = 1.8 g/cm³, Tg = 23.6° C.)

| Example # | ESI #25 (wt %) | Acrylic (wt %) | Endex ™ 155 (wt %) | Tg of Blend (° C.) |
|---|---|---|---|---|
| Example 17 | 100 | 0 | 0 | 22.6 |
| Example 18 | 90 | 10 | 0 | 22.7 |
| Example 19 | 90 | 0 | 10 | 25.0 |
| Example 20 | 80 | 10 | 10 | 24.2 |
| Example 21 | 70 | 10 | 20 | 28.1 |

The data in Table 17 and 18 demonstrate that the Tg of the substantially random ethylene/styrene interpolymers having the desired shape memory property increases with the addition of the tackifier and the second polymer component described and used in the present invention.

Effect of Added Tackifiers and a Second Blend Component on the Modulus of Substantially Random Ethylene/Styrene Interpolymers Having the Shape Memory Property

EXAMPLES 22–29

Examples 22–25 are compression molded plaques and Examples 26–29 are fibers prepared as for Example IO made from a blend of ESI 25 having a styrene content of 42 mol % (73 wt %) and a Gottfert melt index of 1.8 g/cm³ with Endex TM 155 tackifier and/or acrylic in the relative proportions summarized in Table 19 The blends were prepared as for Example 20.

TABLE 19

Effect of Endex ™ 155 and Acrylic on Modulus at 20° C.
and 33° C. of ESI #25 (42 mol % styrene, Gottfert = 1.8 g/cm³, Tg = 23.6° C.)

| Example # | ESI #25 (wt %) | Endex ™ 155 (wt %) | Acrylic (wt %) | Modulus at 20° C. (psi) | Modulus at 33° C. (psi) |
|---|---|---|---|---|---|
| Example 22 | 100 | 0 | 0 | 11,600 | — |
| Example 23 | 90 | 10 | | 4,300 | — |
| Example 24 | 100 | 0 | | — | 290 |
| Example 25 | 90 | 10 | | — | 290 |
| Example 26 | 100 | 0 | 0 | 87,000 | |
| Example 27 | 70 | 20 | 10 | 140,000 | |
| Example 28 | 100 | 0 | 0 | | 2,900 |
| Example 29 | 70 | 20 | 10 | | 58,000 |

The data in Table 19 demonstrate that both the ESI interpolymer and its blend with 10 wt % acrylic and 20 wt % Endex™ 155 have an equivalent change in modulus above and below the Tg.

EXAMPLES 30–44

A series of bicomponent fibers were prepared from ESI 38 and the following second polymer components:

PP1—a 35 MFR Polypropylene available from Montell having the product designation PF 635

PET1–a Polyester available from Wellman having the product designation Blend 9869, lot# 61418.

PE1—a linear low density ethylene/octene copolymer having a melt index, $I_2$, of 17.0 g/10 min and a density of 0.950 g/cm³.

SAN2–a styrene-acrylonitrile copolymer available from Dow Chemical having the product designation TYRIL™ 100.

The substantially random ethylene/styrene copolymer ESI 38 was prepared using the same catalyst and cotalyst as ESI 9 and the same polymerization procedures as ESI's 26-31 using the process conditions in Table 20. ESI 38 had a melt index, $I_2$ of 0.94 g/10 min, an interpolymer styrene content of 77.42 wt % (48.0 mol %) and an atactic polystyrene content of 7.48 wt %, and contained 0.24 wt % talc and 0.20 wt % siloxane binder.

TABLE 20

| ESI # | Reactor Temp °C. | Solvent Flow lb/hr | Ethylene Flow lb/hr | Hydrogen Flow sccm | Styrene Flow lb/hr | Ethylene Conversion % | B/Ti Ratio | MMAO/Ti Ratio |
|---|---|---|---|---|---|---|---|---|
| ESI 38 | 57 | 755 | 33 | 100 | 243 | 98 | 4 | 8 |

A series of sheath core bicomponent fibers were produced by coextruding a substantially random ethylene/styrene interpolymer (ESI-38) as the core and a second polymer as the sheath. The fibers were fabricated using two 1.25 inch diameter extruders which fed two gear pumps each pumping at a rate of 6 cm$^3$/rev multiplied by the meter pump speed in rpm (given in Table 21). The gear pumps pushed the material through a spin pack containing a filter and a multiple hole spinneret. The spin head temperature was typically from about 275–300° C., and varied depending upon the melting point and degradation temperature of the polymer components being spun. Generally the higher the molecular weight of the polymers, the higher the melt temperature. Quench air (about 10 to about 30° C.) was used to help the melt spun fibers cool. The quench air was located just below the spinneret and blows air perpendicularly across the length of the fibers as they are extruded. The fibers were collected on a series of godet rolls to produce the yarn. The first godet located about 2.5 meters below the spinneret die and having a diameter of about 6 inches (15.24 cm). The godet roll speeds were adjustable, but for Examples 30–44, the godet speeds ranged from about 100–about 1000 meters/minute. The compositions and fabrication conditions for the fibers of Examples 30–44 are summarized in Table 21. All examples are round core sheath bicomponent fibers with the exception of Example 40 which had a delta core sheath configuration.

TABLE 21

|  | Ex. 30 | | Ex. 31 | | Ex. 32 | | Ex. 33 | | Ex. 34 | | Ex. 35 | | Ex. 36 | |
|---|---|---|---|---|---|---|---|---|---|---|---|---|---|---|
|  | Core | Sheath | Core | Sheath | Core | Sheath | Core | Sheath | Core | Sheath | Core | Sheath | Core | Sheath |
| Bico Configuration |  |  |  |  |  |  |  |  |  |  |  |  |  |  |
| Polymer Type | ESI | PP | ESI | PP | ESI | PP | ESI | PP | ESI | PE | ESI | PE | ESI | PE |
| Polymer Ratio (wt. %) | 50 | 50 | 50 | 50 | 70 | 30 | 70 | 30 | 50 | 50 | 50 | 50 | 50 | 50 |
| Extruder Temp Zone 1 (° F.) | 220 | 199 | 217 | 200 | 217 | 200 | 217 | 200 | 220 | 200 | 220 | 200 | 220 | 200 |
| Extruder Temp Zone 2 (° F.) | 227 | 210 | 227 | 210 | 227 | 210 | 227 | 210 | 220 | 210 | 220 | 210 | 220 | 210 |
| Extruder Temp Zone 3 (° F.) | 270 | 222 | 270 | 220 | 270 | 220 |  | 220 | 270 | 225 | 270 | 225 | 270 | 225 |
| Extruder Temp Zone 4 (° F.) | 275 | 240 | 275 | 240 | 275 | 240 | 275 | 240 | 275 | 240 | 275 | 240 | 275 | 240 |
| Melt Temperature (° F.) | 282 | 282 | 286 | 286 | 286 | 286 | 286 | 286 | 284 | 282 | 284 | 282 | 284 | 282 |
| Extruder Pressure (psi) | 750 | 750 | 750 | 750 | 750 | 750 | 750 | 750 | 750 | 750 | 750 | 750 | 750 | 750 |
| Pack Pressure (psi) | 2070 | 1122 | 2720 | 1510 | 2720 | 1210 | 2860 | 1290 | 2270 | 1570 | 2270 | 1570 | 2270 | 1570 |
| Meter Pump Speed (rpm) | 5.13 | 3.84 | 8.22 | 10.42 | 8.91 | 5.1 | 12.18 | 6.97 | 4.33 | 4.56 | 4.33 | 4.56 | 4.33 | 4.56 |
| Extruder amps (A) | 4.2 | 2.6 | 4 | 5.3 | 5.6 | 3 | 6.1 | 3.1 | 4.5 | 2.7 | 4.5 | 2.7 | 4.5 | 2.7 |
| Denier Roll Speed (mpm) | 151 |  | 151 |  | 151 |  | 151 |  | 125 |  | 125 |  | 125 |  |
| Tension Roll Speed (mpm) | 151 |  | 152 |  | 152 |  | 152 |  | 127 |  | 127 |  | 127 |  |
| Draw Roll #1 Speed/Temp (mpm/° C.) | 151/50 |  | 152/50 |  | 152/65 |  | 152/65 |  | 128/65 |  | 128/65 |  | 128/65 |  |
| Draw Roll #2 Speed/Temp (mpm/° C.) | 306/50 |  | 551/50 |  | 551/65 |  | 551/65 |  | 390/65 |  | 350/65 |  | 260/65 |  |
| Relax Roll Speed/Temp (mpm/° C.) | 292/25 |  | 534/25 |  | 534/25 |  | 534/25 |  | 250/65 |  | 250/65 |  | 250/65 |  |
| Spin Head Temperature (° C.) | 295 |  | 295 |  | 295 |  | 295 |  | 295 |  | 295 |  | 295 |  |
| Quench Air Temperature (° F.) | 68 |  | 68 |  | 68 |  | 68 |  | 68 |  | 68 |  | 68 |  |

|  | Ex. 37 | | Ex. 38 | | E. 39 | | Ex. 40 | |
|---|---|---|---|---|---|---|---|---|
|  | Core | Sheath | Core | Sheath | Core | Sheath | ΔCore | ΔSheath |
| Bico Configuration |  |  |  |  |  |  |  |  |
| Polymer Type | ESI | PE | ESI | PE | ESI | PE | ESI | PE |
| Polymer Ratio (wt. %) | 60 | 40 | 70 | 30 | 70 | 30 | 70 | 30 |
| Extruder Temp. Zone 1 (° F.) | 220 | 200 | 220 | 200 | 220 | 200 | 220 | 200 |

TABLE 21-continued

| | | | | | | | | |
|---|---|---|---|---|---|---|---|---|
| Extruder Temp Zone 2 (° F.) | 220 | 210 | 220 | 210 | 220 | 210 | 220 | 210 |
| Extruder Temp Zone 3 (° F.) | 270 | 225 | 270 | 225 | 270 | 225 | 270 | 225 |
| Extruder Temp Zone 4 (° F.) | 275 | 240 | 275 | 240 | 275 | 240 | 275 | 240 |
| Melt Temperature (° F.) | 284 | 282 | 284 | 282 | 284 | 282 | 290 | 283 |
| Extruder Pressure (psi) | 750 | 750 | 750 | 750 | 750 | 750 | 750 | 750 |
| Pack Pressure (psi) | 2430 | 1520 | 2610 | 1480 | 2610 | 1480 | 2640 | 1190 |
| Meter Pump Speed (rpm) | 5.2 | 36.5 | 6.06 | 2.73 | 6.06 | 2.73 | 14.56 | 6.57 |
| Extruder amps (A) | 4.1 | 2.5 | 4.6 | 2.3 | 4.6 | 2.3 | 4 | 2.8 |
| Denier Roll Speed (mpm) | 125 | | 125 | | 125 | | 125 | |
| Tension Roll Speed (mpm) | 127 | | 127 | | 127 | | 127 | |
| Draw Roll #1 Speed/Temp (mpm/ | 128/65 | | 128/65 | | 128/6 | | 129/65 | |
| Draw Roll #2 Speed/Temp (mpm/ | 260/65 | | 290/65 | | 260/6 | | 390/65 | |
| Relax Roll Speed/Temp (mpm/° C.) | 250/25 | | 250/25 | | 250/25 | | 350/25 | |
| Spin Head Temperature (° C.) | 295 | | 295 | | 295 | | 295 | |
| Quench Air Temperature (° F.) | 68 | | 68 | | 68 | | | |

| | Ex. 41 | | Ex. 42 | | Ex. 43 | | Ex. | |
|---|---|---|---|---|---|---|---|---|
| Bico Configuration | Core | Sheath | Core | Sheath | Core | Sheath | Core | Sheath |
| Polymer Type | ESI | PET | ESI | PET | ESI | PET | ESI | SAN |
| Polymer Ratio (wt. %) | 70 | 30 | 90 | 10 | 90 | 10 | 10 | 90 |
| Extruder Temp. Zone 1 (° F.) | 216 | 289 | 217 | 290 | 217 | 290 | 220 | 230 |
| Extruder Temp Zone 2 (° F.) | 222 | 290 | 221 | 295 | 222 | 295 | 220 | 235 |
| Extruder Temp Zone 3 (° F.) | 269 | 291 | 268 | 291 | 269 | 295 | 270 | 240 |
| Extruder Temp Zone 4 (° F.) | 275 | 294 | 275 | 294 | 275 | 294 | 275 | 240 |
| Melt Temperature (° F.) | 297 | 295 | 301 | 298 | 301 | 298 | 270 | 268 |
| Extruder Pressure (psi) | 750 | 750 | 750 | 750 | 750 | 750 | 750 | 750 |
| Pack Pressure (psi) | 2130 | 1037 | 2540 | 990 | 2980 | 1060 | 2200 | 450 |
| Meter Pump Speed (rpm) | 14.36 | 5.66 | 19.25 | 2.1 | 42.5 | 4.67 | 14.4 | 1.6 |
| Extruder amps (A) | 4.7 | 3 | 3.63 | 2.5 | 701 | 3 | 4.7 | 12.5 |
| Denier Roll Speed (mpm) | 250 | | 200 | | 200 | | 200 | |
| Tension Roll Speed (mpm) | 251 | | 203 | | 203 | | 202 | |
| Draw Roll #1 Speed/Temp (mpm/ | 252/65 | | 203/65 | | 203/65 | | 201 | |
| Draw Roll #2 Speed/Temp (mpm/ | 807/65 | | 605/65 | | 606/65 | | 400 | |
| Relax Roll Speed/Temp (mpm/° C.) | 794/25 | | 604/25 | | 604/25 | | 300 | |
| Spin Head Temperature (° C.) | 300 | | 299 | | 300 | | 275 | |
| Quench Air Temperature (° F.) | 66 | | 52 | | 52 | | 52 | |

Approximately 45 m of the resulting yarn was transferred to a denier wheel which was then weighed to determine the number of denier per filament. The resulting yarn were tested on an Model 100 Instron tensile testing device equipped with a type 4C (INSTRON #2714-004, 150 lb cap./90 psi max)jaw on the cross-head and a 100 lb load cell. The cross head speed was set at 130 mm/min. The yarn was loaded into the Instron jaws for testing. The yarn was then stretched to break and the ultimate breaking tenacity and elongation were recorded. The results of the testing are summarized in Table 22.

TABLE 22

Bicomponent Fiber Properties+

| Example # | Denier (dn) | Tenacity (g/dn) | Elongation (%) |
|---|---|---|---|
| 30 | 1127 (1130) | 1.12 (1.10) | 146 (140) |
| 31 | 1186 (1190) | 1.81 (1.80) | 56 (50) |
| 32 | 950 (952) | 2.10 (1.90) | 92 (88) |
| 33 | 1230 (1238) | 1. (1.60) | 86 (80) |
| 34 | 826 (823) | 1.13 (1.30) | 121 (103) |
| 35 | 1256 (1261) | 0.87 (0.83) | 162 (186) |
| 36 | 1227 (1226) | 0.80 (0.67) | 217 (207) |
| 37 | 1224 (1222) | 0.93 (1.05) | 130 (140) |
| 38 | 840 (874) | 1.50 (1.10) | 186 (127) |
| 39 | 1224 (1217) | 0.96 (0.92) | 200 (184) |
| 40 | 1110 (1083) | 1.33 (1.13) | 144 (150) |

TABLE 22-continued

Bicomponent Fiber Properties+

| Example # | Denier (dn) | Tenacity (g/dn) | Elongation (%) |
|---|---|---|---|
| 41 | 1170 (1174) | 2.31 (2.30) | 71 (69) |
| 42 | 954 (534) | 1.16 (1.80) | 61 (53) |
| 43 | 1460 (1450) | 1.55 (1.25) | 151 (85) |
| 44 | * | * | * |

+values in parentheses represent same measurements made after 48 hr.
*the data generated from this example had too much variability to accurately determine a value.

These results demonstrate that bicomponent fibers can be prepared with improved tenacity ($\geq 0.8$ g/dn) which remains, along with other physical properties, relatively unchanged over time. Thus choice of the sheath component can be used to instill the physical properties of the fiber while the choice core component can be used to exert an influence on the elongation and other stress strain characteristics.

What is claimed is:

1. A structure or fabricated article having shape memory behavior comprising;
   (A) from about 1 to 100 wt % (based on the combined weights of Components A and B) of at least one substantially random interpolymer having an $I_2$ of 0.1 to about 1,000 g/10 min and an $M_w/M_n$ of from about 1.5 to about 20, which comprises;
      (1) from about 38 to about 65 mol % of polymer units derived from;
         (a) at least one vinyl or vinylidene aromatic monomer, or (b) at least one hindered aliphatic or cycloaliphatic vinyl or vinylidene monomer, or (c) a combination of at least one aromatic vinyl or vinylidene monomer and at least one hindered aliphatic or cycloaliphatic vinyl or vinylidene monomer, and (2) from about 35 to about 62 mol % of polymer units derived from ethylene and/or at least one $C_{3\text{-}20}$ α-olefin; and (B) from 0 to about 99 wt % (based on the combined weights of Components A and B) of at least one polymer other than that of Component A; and (C) from 0 to about 50% by weight (based on the combined weights of components A, B, C and D) of at least one tackifier; and (D) from 0 to about 80% by weight (based on the combined weights of components A, B, C and D) of at least one filler.

2. The structure or fabricated article of claim 1 wherein;

(i) Component (A) is present in an amount of from about 10 to 100 wt % (based on the combined weights of Components A and B) and comprises at least one substantially random interpolymer having an $I_2$ of 0.5 to about 200 g/10 min and an $M_w/M_n$ of from about 1.8 to about 10; comprising (1) from about 45 to about 55 mol % of polymer units derived from;

(a) said vinyl or vinylidene aromatic monomer represented by the following formula;

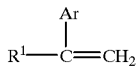

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1\text{-}4}$-alkyl, and $C_{1\text{-}4}$-haloalkyl; or (b) said hindered aliphatic or cycloaliphatic vinyl or vinylidene monomer is represented by the following general formula;

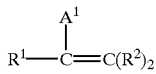

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system; or (C) A combination of at least one aromatic vinyl or vinylidene monomer and at least one hindered aliphatic or cycloaliphatic vinyl or vinylidene monomer, and (2) from about 45 to about 55 mol % of polymer units derived from ethylene, or ethylene and at least one of propylene, 4-methyl-1-pentene, butene-1, hexene-1 or octene-1; and ii) Component B is present in amount of from 0 to about 90 wt % (based on the combined weights of Components A and B) and comprises one or more of 1) a homogeneous interpolymer,
2) a heterogeneous interpolymer;
3) a thermoplastic olefin,
4) a styrenic block copolymer,
5) a styrenic copolymer,
6) an elastomer,
7) a thermoset polymer,
8) a vinyl halide polymer, or
9) an engineering thermoplastic; and iii) said tackifier, Component C, is present in an amount from about 5 to about 50% by weight (based on the combined weights of components A, B, C, and D) and comprises wood rosin, tall oil derivatives, cyclopentadiene derivatives, natural and synthetic terpenes, terpenephenolics, styrene/α-methyl styrene resins, and mixed aliphatic-aromatic tackifying resins or any combination thereof; and iv) said filler, Component D, is present in an amount from 0 to about 50% by weight (based on the combined weights of components A, B, C, and D) and comprises talc, calcium carbonate, alumina trihydrate, carbon black, glass fibers, clay, feldspar, silica or glass, fumed silica, alumina, magnesium oxide, magnesium hydroxide, antimony oxide, zinc oxide, barium sulfate, aluminum silicate, calcium silicate, titanium dioxide, glass microspheres, chalk or any combination thereof.

3. The structure or fabricated article of claim 1 wherein;

(i) Component (A) is present in an amount of from about 50 to 100 wt % (based on the combined weights of Components A and B)) and comprises at least one substantially random interpolymer having an $I_2$ of 0.5 to about 100 g/10 min and an $M_w/M_n$ of from about 2 to about 5;

(1) from about 48 to about 55 mol % of polymer units derived from;

a) said vinyl or vinylidene aromatic monomer which comprises styrene, α-methyl styrene, ortho-, meta-, and para-methylstyrene, and the ring halogenated styrenes, or b) said hindered aliphatic or cycloaliphatic vinyl or vinyl or vinylidene monomers which comprises 5-ethylidene-2-norbornene or 1-vinylcyclohexene, 3-vinylcyclo-hexene, and 4-vinylcyclohexene; or C) A combination of at least one aromatic vinyl or vinylidene monomer and at least one hindered aliphatic or cycloaliphatic vinyl or vinylidene monomer, and (2) from about 45 to about 52 mol % of polymer units derived from ethylene, or ethylene and at least one of propylene, 4-methyl-1-pentene, butene-1, hexene-1 or octene-1; or ii) Component B is present in amount of from 0 to about 50 wt % (based on the combined weights of Components A and B) and comprises one or more of;

1) a substantially linear ethylene/α-olefin interpolymer;
2) a heterogeneous ethylene/$C_3$–$C_8$ (α-olefin interpolymer;
3) an ethylene/propylene rubber (EPM), ethylene/propylene diene monomer terpolymer (EPDM), isotactic polypropylene;
4) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer,
5) the acrylonitrile-butadiene-styrene (ABS) polymers, styrene-acrylonitrile (SAN), high impact polystyrene, 6) polyisoprene, polybutadiene, natural rubbers, ethylene/propylene rubbers, ethylene/propylene diene (EPDM) rubbers, styrene/butadiene rubbers, thermoplastic polyurethanes, 7) epoxies, vinyl ester resins, polyurethanes, phenolic resins, 8) homopolymers or copolymers of vinyl chloride or vinylidene chloride, 9) poly(methylmethacrylate), polyester,nylon-6, nylon-6,6, poly(acetal); poly(amide), poly(arylate), poly(carbonate), poly(butylene) and polybutylene, polyethylene terephthalates, and iii) said tackifier, Component C, is present in an amount from about 10 to about 40% by weight (based on the combined weights of components A, B, C and D) and comprises, styrene/α-methyl styrene resins, and mixed aliphatic-aromatic tackifying resins or any combination thereof; and iv) said filler, Component D, is present in an amount from 0 to about 20% by weight (based on the combined weights of components A, B, C, and D) and comprises talc, calcium carbonate, alumina trihydrate, barium sulfate, titanium dioxide, or any combination thereof.

4. The structure or fabricated article of claim 3 wherein Component A1 is styrene, Component A2 is ethylene, Component B is poly(methylmethacrylate), and Component C is a styrene/α-methyl styrene resin.

5. The structure or fabricated article of claim 3 wherein Component A1 is styrene; and Component A2 is ethylene and at least one of propylene, 4-methyl-1-pentene, butene-1, hexene-1 or octene-1; Component B is poly(methylmethacrylate), and Component C is a styrene/α-methyl styrene resin.

6. The fabricated article of claim 4 in the form of doll hair.

7. The fabricated article of claim 5 in the form of doll hair.

8. The fabricated article of claim 4 in the form of a toy.

9. The fabricated article of claim 5 in the form of a toy.

10. A process for shaping and reshaping a structure or fabricated article from a polymer having an original modulus, wherein said process comprises;

I) one or more applications of an energy source to said polymer which causes its modulus to decrease below said original modulus, II) shaping or conforming said structure or fabricated article into a prescribed position, III) removing said energy source which caused it to assume said prescribed position so as to regain said original modulus;

and wherein said polymer comprises;

(A) from about 1 to 100 wt % (based on the combined weights of Components A and B) of at least one substantially random interpolymer having an $I_2$ of 0.1 to about 1,000 g/10 min and an $M_w/M_n$ of from about 1.5 to about 20 which comprises;

(1) from about 38 to about 65 mol % of polymer units derived from;

(a) at least one vinyl or vinylidene aromatic monomer, or (b) at least one hindered aliphatic or cycloaliphatic vinyl or vinylidene monomer, or (c) a combination of at least one aromatic vinyl or vinylidene monomer and at least one hindered aliphatic or cycloaliphatic vinyl or vinylidene monomer, and (2) from about 35 to about 62 mol % of polymer units derived from ethylene and/or at least one $C_{3-20}$ α-olefin; and (B) from 0 to about 99 wt % (based on the combined weights of Components A and B) of at least one polymer other than that of Component A; and (C) from 0 to about 50% by weight (based on the combined weights of components A, B, C and D) of at least one tackifier; and (D) from 0 to about 80% by weight (based on the combined weights of components A, B, C and D) of at least one filler.

11. The process of claim 10 wherein;

(i) Component (A) is present in an amount of from about 10 to 100 wt % (based on the combined weights of Components A and B) and comprises at least one substantially random interpolymer having an $I_2$ of 0.5 to about 200 g/10 min and an $M_w/M_n$ of from about 1.8 to about 10; comprising (1) from about 45 to about 55 mol % of polymer units derived from;

(a) said vinyl or vinylidene aromatic monomer represented by the following formula;

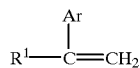

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl; or (b) said hindered aliphatic or cycloaliphatic vinyl or vinylidene monomer is represented by the following general formula;

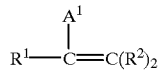

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system; or (C) A combination of at least one aromatic vinyl or vinylidene monomer and at least one hindered aliphatic or cycloaliphatic vinyl or vinylidene monomer, and 2) from about 45 to about 55 mol % of polymer units derived from ethylene, or ethylene and at least one of propylene, 4-methyl-1-pentene, butene-1, hexene-1 or octene-1; and ii) Component B is present in amount from 0 to about 90 wt % (based on the combined weights of Components A and B) and comprises one or more of 1) a homogeneous interpolymer, 2) a heterogeneous interpolymer;

3) a thermoplastic olefin, 4) a styrenic block copolymer, 5) a styrenic copolymer, 6) an elastomer, 7) a thermoset polymer, 8) a vinyl halide polymer, or
(9 an engineering thermoplastic; and
iii) said tackifier, Component C, is present in an amount from 5 to about 50% by weight (based on the combined weights of components A, B, C, and D) and comprises wood rosin, tall oil derivatives, cyclopentadiene derivatives, natural and synthetic terpenes, terpene-phenolics, styrene/α-methyl styrene resins, and mixed aliphatic-aromatic tackifying resins or any combination thereof; and
iv) said filler, Component D, is present in an amount from 0 to about 50% by weight (based on the combined weights of components A, B, C, and D) and comprises talc, calcium carbonate, alumina trihydrate, carbon black, glass fibers, clay, feldspar, silica or glass, fumed silica, alumina, magnesium oxide, magnesium hydroxide, antimony oxide, zinc oxide, barium sulfate, aluminum silicate, calcium silicate, titanium dioxide, glass microspheres, chalk or any combination thereof.

12. The process of claim 10 wherein;
(i) Component (A) is present in an amount from about 50 to 100 wt % (based on the combined weights of Components A and B)) and comprises at least one substantially random interpolymer having, an $I_2$ of 0.5 to about 100 g/10 min and an $M_w/M_n$ of from about 2 to about 5 comprising;
  (1) from about 48 to about 55 mol % of polymer units derived from;
    a) said vinyl or vinylidene aromatic monomer which comprises styrene, α-methyl styrene, ortho-, meta-, and para-methylstyrene, and the ring halogenated styrenes, or
    b) said hindered aliphatic or cycloaliphatic vinyl or vinylidene monomers which comprises 5-ethylidene-2-norbornene or 1-vinylcyclohexene, 3-vinylcyclo-hexene, and 4-vinylcyclohexene; or
  (C) A combination of at least one aromatic vinyl or vinylidene monomer and at least one hindered aliphatic or cycloaliphatic vinyl or vinylidene monomer, and 2) from about 45 to about 52 mol % VINYLIDENE MONOMER, AND 2) from about 45 to about 52 mol % of polymer units derived from ethylene, or ethylene and at least one of propylene, 4-methyl-1-pentene, butene-1, hexene-1 or octene-1; or
ii) Component B is present in amount from 0 to about 50 wt % (based on the combined weights of Components A and B) and comprises one or more of;
  1) a substantially linear ethylene/α-olefin interpolymer;
  2) a heterogeneous ethylene/$C_3$–$C_8$ α-olefin interpolymer;
  3) an ethylene/propylene rubber (EPM), ethylene/propylene diene monomer terpolymer (EPDM), isotactic polypropylene;
  4) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer,
  5) the acrylonitrile-butadiene-styrene (ABS) polymers, styrene-acrylonitrile (SAN), high impact polystyrene,
  6) polyisoprene, polybutadiene, natural rubbers, ethylene/propylene rubbers, ethylene/propylene diene (EPDM) rubbers, styrene/butadiene rubbers, thermoplastic polyurethanes,
  7) epoxies, vinyl ester resins, polyurethanes, phenolic resins,
  8) homopolymers or copolymers of vinyl chloride or vinylidene chloride,
  9) poly(methylmethacrylate), polyester, nylon-6, nylon-6,6, poly(acetal); poly(amide), poly(arylate), poly(carbonate), poly(butylene) and polybutylene, polyethylene terephthalates, and
iii) said tackifier, Component C, is present in an amount from 10 to about 40% by weight (based on the combined weights of components A, B, C and D) and comprises, styrene/α-methyl styrene resins, and mixed aliphatic-aromatic tackifying resins or any combination thereof, and
iv) said filler, Component D, is present in an amount from 0 to about 20% by weight (based on the combined weights of components A, B, C, and D) and comprises talc, calcium carbonate, alumina trihydrate, barium sulfate, titanium dioxide, or any combination thereof.

13. The process of claim 12 wherein said energy source is heat and wherein Component A1 is styrene, and Component A2 is ethylene, Component B is poly(methylmethacrylate), and Component C is a styrene/α-methyl styrene resin.

14. The process of claim 12 wherein said energy source is heat and wherein Component A1 is styrene; and Component A2 is ethylene and at least one of propylene, 4-methyl-1-pentene, butene-1, hexene-1 or octene-1, Component B is poly(methylmethacrylate), and Component C is a styrene/α-methyl styrene resin.

15. A bicomponent fiber having shape memory behavior comprising;
(I) a first component comprising from about 5 to 95 wt % (based on the combined weights of Components I and II) of
  (A) from about 1 to 100 wt % (based on the combined weights of Components A and B) of at least one substantially random interpolymer having an $I_2$ of 0.1 to about 1,000 g/10 min and an $M_w/M_n$ of from about 1.5 to about 20, which comprises;
    (1) from about 38 to about 65 mol % of polymer units derived from;
      (a) at least one vinyl or vinylidene aromatic monomer, or
      (b) at least one hindered aliphatic or cycloaliphatic vinyl or vinylidene monomer, or
      (c) a combination of at least one aromatic vinyl or vinylidene monomer and at least one hindered aliphatic or cycloaliphatic vinyl or vinylidene monomer, and
    (2) from about 35 to about 62 mol % of polymer units derived from ethylene and/or at least one $C_{3-20}$ α-olefin; and
  (B) from 0 to about 99 wt % (based on the combined weights of Components A and B) of at least one polymer other than that of Component A; and
  (C) from 0 to about 50% by weight (based on the combined weights of components A, B, C and D) of at least one tackifier; and
  (D) from 0 to about 80% by weight (based on the combined weights of components A, B, C and D) of at least one filler; and
(II) a second component, present in amount of from 5 to about 95 wt % (based on the combined weights of Components I and II) which comprises one or more of;
  A) an ethylene or α-olefin homopolymer or interpolymer;
  B) an ethylene/propylene rubber (EPM), ethylene/propylene diene monomer terpolymer (EPDM), isotactic polypropylene;

C) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer, D) the acrylonitrile-butadiene-styrene (ABS) polymers, styrene-acrylonitrile (SAN), high impact polystyrene, E) polyisoprene, polybutadiene, natural rubbers, ethylene/propylene rubbers, ethylene/propylene diene (EPDM) rubbers, styrene/butadiene rubbers, thermoplastic polyurethanes, F) epoxies, vinyl ester resins, polyurethanes, phenolic resins, G) homopolymers or copolymers of vinyl chloride or vinylidene chloride, H) poly(methylmethacrylate), polyester,nylon-6, nylon-6,6, poly(acetal); poly(amide), poly(arylate), poly(carbonate), poly(butylene) and polybutylene, polyethylene terephthalates.

16. The bicomponent fiber of claim 15 which is of the sheath/core type, segmented pie type, side-by-side or "islands in the sea" type; and wherein;

(i) said first component I comprises from about 25 to 95 wt % (based on the combined weights of Components I and II);

(ii) Component (A) is present in an amount of from about 10 to 100 wt % (based on the combined weights of Components A and B) and comprises at least one substantially random interpolymer having an $I_2$ of 0.5 to about 200 g/10 min and an $M_w/M_n$ of from about 1.8 to about 10; comprising (1) from about 45 to about 55 mol % of polymer units derived from;

(a) said vinyl or vinylidene aromatic monomer represented by the following formula;

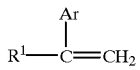

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl; or (b) said hindered aliphatic or cycloaliphatic vinyl or vinylidene monomer is represented by the following general formula;

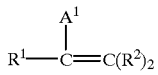

wherein A is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system; or (c) a combination of at least one aromatic vinyl or vinylidene monomer and at least one hindered aliphatic or cycloaliphatic vinyl or vinylidene monomer, and (2) from about 45 to about 55 mol % of polymer units derived from ethylene, or ethylene and at least one of propylene, 4-methyl-1-pentene, butene-1, hexene-1 or octene-1; and iii) Component B is present in amount of from 0 to about 90 wt % (based on the combined weights of Components A and B) and comprises one or more of 1) a homogeneous interpolymer,
2) a heterogeneous interpolymer;
3) a thermoplastic olefin,
4) a styrenic block copolymer,
5) a styrenic copolymer,
6) an elastomer,
7) a thermoset polymer,
8) a vinyl halide polymer, or
9) an engineering thermoplastic; and iv) said tackifier, Component C, is present in an amount from about 5 to about 50% by weight (based on the combined weights of components A, B, C, and D) and comprises wood rosin, tall oil derivatives, cyclopentadiene derivatives, natural and synthetic terpenes, terpene-phenolics, styrene/α-methyl styrene resins, and mixed aliphatic-aromatic tackifying resins or any combination thereof; and v) said filler, Component D, is present in an amount from 0 to about 50% by weight (based on the combined weights of components A, B, C, and D) and comprises talc, calcium carbonate, alumina trihydrate, carbon black, glass fibers, clay, feldspar, silica or glass, fumed silica, alumina, magnesium oxide, magnesium hydroxide, antimony oxide, zinc oxide, barium sulfate, aluminum silicate, calcium silicate, titanium dioxide, glass microspheres, chalk or any combination thereof; and (vi) said second component, II, is present in amount of from 5 to about 75 wt % (based on the combined weights of Components I and II) which comprises one or more of, A) an ethylene or α-olefin homopolymer or interpolymer;

B) an ethylene/propylene rubber (EPM), ethylene/propylene diene monomer terpolymer (EPDM), isotactic polypropylene;

C) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer, D) the acrylonitrile-butadiene-styrene (ABS) polymers, styrene-acrylonitrile (SAN), high impact polystyrene, E) epoxies, vinyl ester resins, polyurethanes, phenolic resins, F) poly(methylmethacrylate), polyester,nylon-6, nylon-6,6, poly(acetal); poly(amide), poly(arylate), poly(carbonate), poly(butylene) and polybutylene, polyethylene terephthalates.

17. The bicomponent fiber of claim 16 wherein;

(i) said first component I comprises from about 50 to 95 wt % (based on the combined weights of Components I and II);

(ii) Component (A) is present in an amount of from about 50 to 100 wt % (based on the combined weights of Components A and B)) and comprises at least one substantially random interpolymer having an $I_2$ of 0.5 to about 100 g/10 min and an $M_w/M_n$ of from about 2 to about 5;

(1) from about 48 to about 55 mol % of polymer units derived from;
  a) said vinyl or vinylidene aromatic monomer which comprises styrene, α-methyl styrene, ortho-, meta-, and para-methylstyrene, and the ring halogenated styrenes, or
  b) said hindered aliphatic or cycloaliphatic vinyl or vinylidene monomers which comprises 5-ethylidene-2-norbornene or 1-vinylcyclohexene, 3-vinylcyclo-hexene, and 4-vinylcyclohexene; or
  c) a combination of at least one aromatic vinyl or vinylidene monomer and at least one hindered aliphatic or cycloaliphatic vinyl or vinylidene monomer, and (I$_2$) from about 45 to about 52 mol % of polymer units derived from ethylene, or ethylene and at least one of propylene, 4-methyl-1-pentene, butene-1, hexene-1 or octene-1; or iii) Component B is present in amount of from 0 to about 50 wt % (based on the combined weights of Components A and B) and comprises one or more of;
  1) a substantially linear ethylene/α-olefin interpolymer;
  2) a heterogeneous ethylene/C$_3$–C$_8$ α-olefin interpolymer;
  3) an ethylene/propylene rubber (EPM), ethylene/propylene diene monomer terpolymer (EPDM), isotactic polypropylene;
  4) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer,
  5) the acrylonitrile-butadiene-styrene (ABS) polymers, styrene-acrylonitrile (SAN), high impact polystyrene,
  6) polyisoprene, polybutadiene, natural rubbers, ethylene/propylene rubbers, ethylene/propylene diene (EPDM) rubbers, styrene/butadiene rubbers, thermoplastic polyurethanes,
  7) epoxies, vinyl ester resins, polyurethanes, phenolic resins,
  8) homopolymers or copolymers of vinyl chloride or vinylidene chloride,
  9) poly(methylmethacrylate), polyester,nylon-6, nylon-6,6, poly(acetal); poly(amide), poly(arylate), poly(carbonate), poly(butylene) and polybutylene, polyethylene terephthalates, and iv) said tackifier, Component C, is present in an amount from about 10 to about 40% by weight (based on the combined weights of components A, B, C and D) and comprises , styrene/u-methyl styrene resins, and mixed aliphatic-aromatic tackifying resins or any combination thereof, and v) said filler, Component D, is present in an amount from 0 to about 20% by weight (based on the combined weights of components A, B, C, and D) and comprises talc, calcium carbonate, alumina trihydrate, barium sulfate, titanium dioxide, or any combination thereof, and (vi) said second component, II, is present in amount of from 5 to about 50 wt % (based on the combined weights of Components I and II) which comprises one or more of,
  A) an ethylene or α-olefin homopolymer or interpolymer;
  B) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer, high impact polystyrene,
  C) poly(methylmethacrylate), polyester,nylon-6, nylon-6,6, poly(acetal); poly(amide), poly(arylate), poly(carbonate), poly(butylene) and polybutylene, polyethylene terephthalates.

18. The bicomponent fiber of claim 17 wherein said fiber is of the core/sheath type and wherein Component I is the core and Component II is the sheath and wherein Component A1 is styrene; and Component A2 is ethylene; Component B is not present and Component II is polypropylene, polyethylene, an ethylene/octene copolymer, polyethylene terephthalate, polystyrene, nylon-6, nylon-6,6, or combinations thereof.

19. The bicomponent fiber of claim 17 wherein said fiber is of the core/sheath type and wherein Component I is the core and Component II is the sheath and wherein Component A1 is styrene; and Component A2 is ethylene and at least one of propylene, 4-methyl-1-pentene, butene-1, hexene-1 or octene-1; Component B is not present and Component II polypropylene, polyethylene, an ethylene/octene copolymer, polyethylene terephthalate, polystyrene, nylon-6, nylon-6,6, or combinations thereof.

20. A fabric comprising the fiber of claim 15.

21. The fabric of claim 20, comprising a woven fabric.

22. The fabric of claim 20, comprising a non-woven fabric.

23. A fabricated article prepared from the fiber of claim 15, comprising carpets, doll hair, a wig, a tampon, a diaper, athletic sportswear, wrinkle free and form-fitting apparel, upholstery, a, bandages, and a gamma sterilizable non-woven articles.

24. A plurality of the fibers of claim 15 in the form of doll hair.

25. A plurality of the fibers of claim 18 in the form of doll hair.

26. A plurality of the fibers of claim 19 in the form of doll hair.

* * * * *